US012628130B2

(12) United States Patent
Zhao et al.

(10) Patent No.: US 12,628,130 B2
(45) Date of Patent: May 12, 2026

(54) RESOURCE SELECTION METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 287 days.

(21) Appl. No.: 18/381,343

(22) Filed: Oct. 18, 2023

(65) Prior Publication Data

US 2024/0073867 A1 Feb. 29, 2024

Related U.S. Application Data

(63) Continuation of application No. PCT/CN2021/089051, filed on Apr. 22, 2021.

(51) Int. Cl.
*H04W 72/02* (2009.01)
*H04W 72/0453* (2023.01)
*H04W 72/40* (2023.01)

(52) U.S. Cl.
CPC ....... *H04W 72/02* (2013.01); *H04W 72/0453* (2013.01); *H04W 72/40* (2023.01)

(58) Field of Classification Search
None
See application file for complete search history.

(56) References Cited

U.S. PATENT DOCUMENTS

| | | | | |
|---|---|---|---|---|
| 2020/0196293 A1* | 6/2020 | Liu | ......................... | H04W 4/40 |
| 2020/0351033 A1 | 11/2020 | Ryu | | |
| 2021/0314921 A1* | 10/2021 | Yang | ..................... | H04W 72/02 |
| 2022/0190966 A1* | 6/2022 | Hosseini | .............. | H04L 1/1896 |
| 2022/0255680 A1* | 8/2022 | Moon | ................... | H04L 1/1664 |
| 2023/0164875 A1* | 5/2023 | Lee | ....................... | H04W 76/23 |
| | | | | 370/329 |

FOREIGN PATENT DOCUMENTS

| | | |
|---|---|---|
| CN | 110536445 A | 12/2019 |
| CN | 111082908 A | 4/2020 |
| CN | 111294175 A | 6/2020 |

(Continued)

OTHER PUBLICATIONS

International Search Report in the international application No. PCT/CN2021/089051, mailed on Dec. 29. 2021. 7 pages with English translation.

(Continued)

*Primary Examiner* — Srinivasa R Reddivalam
(74) *Attorney, Agent, or Firm* — BAYES PLLC

(57) ABSTRACT

Provided in the present application are a resource selection method and apparatus for use in a sidelink communication system. The resource selection method includes: a first terminal receives sidelink data from a second terminal on a plurality of carriers; and the first terminal may select a resource pool for transmitting a PSFCH from the plurality of carriers where the sidelink data is located, or all the plurality of carriers available for sidelink transmission.

20 Claims, 11 Drawing Sheets

A first terminal receives sidelink data from a second terminal on multiple carriers — 101

The first terminal determines, according to a resource pool in which the sidelink data is located, a resource pool for transmitting a PSFCH from the multiple carriers — 102

(56) References Cited

FOREIGN PATENT DOCUMENTS

| CN | 111342941 A | 6/2020 |
| CN | 111865505 A | 10/2020 |
| CN | 112188633 A | 1/2021 |
| CN | 112398594 A | 2/2021 |
| CN | 112448793 A | 3/2021 |
| WO | 2020222565 A1 | 11/2020 |
| WO | 2020263019 A1 | 12/2020 |

OTHER PUBLICATIONS

Written Opinion of the International Search Authority in the international application No. PCT/CN2021/089051, mailed on Dec. 29, 2021. 8 pages with English translation.

* cited by examiner

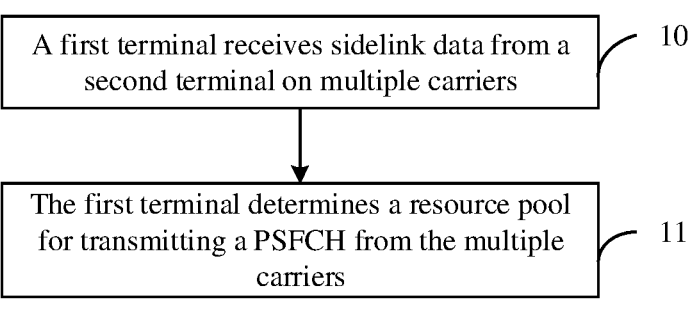

A first terminal receives sidelink data from a second terminal on multiple carriers — 10

The first terminal determines a resource pool for transmitting a PSFCH from the multiple carriers — 11

FIG. 11

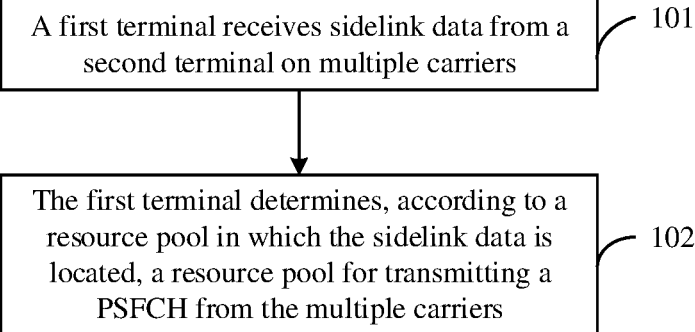

A first terminal receives sidelink data from a second terminal on multiple carriers — 101

The first terminal determines, according to a resource pool in which the sidelink data is located, a resource pool for transmitting a PSFCH from the multiple carriers — 102

FIG. 12

A first terminal receives sidelink data from a second terminal on multiple carriers ⟋ 301

The first terminal determines, according to the first indication information, a resource pool for transmitting a PSFCH from the multiple carriers ⟋ 302

RESOURCE SELECTION METHOD AND APPARATUS, DEVICE AND STORAGE MEDIUM

CROSS-REFERENCE TO RELATED APPLICATION

The present application is a continuation of International Application No. PCT/CN2021/089051 filed on Apr. 22, 2021, the disclosure of which is hereby incorporated by reference in its entirety.

TECHNICAL FIELD

The embodiments of the present application relate to the technical field of wireless communication, and in particular relate to a resource selection method and apparatus.

BACKGROUND

In New Radio (NR) vehicle to everything (V2X) communication, a physical sidelink feedback channel PSFCH is introduced to transmit sidelink feedback information to improve the reliability of sidelink communication. Usually, the receiving terminal receives the sidelink data transmitted by the transmitting terminal, and selects the carrier with the lowest channel occupancy rate for sidelink feedback according to the channel occupancy rate of each carrier.

In order to improve the throughput of sidelink transmission system, sidelink multi-carrier transmission is introduced on sideline (SL), that is, the transmitting terminal or the receiving terminal can transmit data on multiple carriers. In view of the above sidelink feedback, how to determine the resource for transmitting PSFCH by the receiving terminal is an urgent problem to be solved at present.

SUMMARY

The embodiments of the present application provide a resource selection method and apparatus.

In a first aspect, an embodiment of the present application provides a resource selection method, which includes operations that a first terminal receives sidelink data from a second terminal on multiple carriers and the first terminal determines a resource pool for a physical sidelink feedback channel (PSFCH) from multiple carriers.

In a second aspect, an embodiment of the present application provides an electronic device, which includes: a memory for storing a computer program, and a processor for invoking and running the computer program from the memory such that the processor executes the computer program to perform the method of the first aspect of the present application.

BRIEF DESCRIPTION OF THE DRAWINGS

FIG. 11 is a first flowchart of a resource selection method provided by an embodiment of the present application;

FIG. 12 is a second flowchart of a resource selection method provided by an embodiment of the present application;

DETAILED DESCRIPTION

In order to make the object, technical solution and advantages of the embodiments of the present application clearer, the technical solution of the embodiments of the present application will be clearly and completely described in conjunction with the accompanying drawings in the embodiments of the present application below, and it will be obvious that the described embodiments are part of the embodiments of the present application, but not all of them. Based on the embodiments in the present application, all other embodiments obtained by those ordinarily skilled in the art without making creative efforts fall within the scope of protection of the present application.

The terms "comprising" and "having" and any variations thereof in the specification, claims and above accompanying drawings of embodiments of the present application are intended to cover non-exclusive inclusion, for example, processes, methods, systems, products, or devices that contain a series of steps or units do not need to be limited to those steps or units clearly listed, but may include other steps or units not explicitly listed or inherent to such processes, methods, products, or devices.

It should be understood that the reference to "indication" in embodiments of the present application may be a direct indication, may be an indirect indication, or may be indicative of an association. For example, A indicates B, which can mean that A directly indicates B, for example, B can be obtained through A. It can also mean that A indirectly indicates B, for example, A indicates C, and B can be obtained through C. It can also mean that there is an association between A and B.

In the description of embodiments of the present application, the term "correspond" may mean that there is a direct correspondence or an indirect correspondence relationship between the two, may also mean that there is an association relationship between the two, may also be a relationship between indication and being indicated, configuration and being configured, etc.

Before introducing the technical solution provided by the embodiments of the present application, the possible application scenarios of the embodiments of the present application are first explained.

Figure 1:
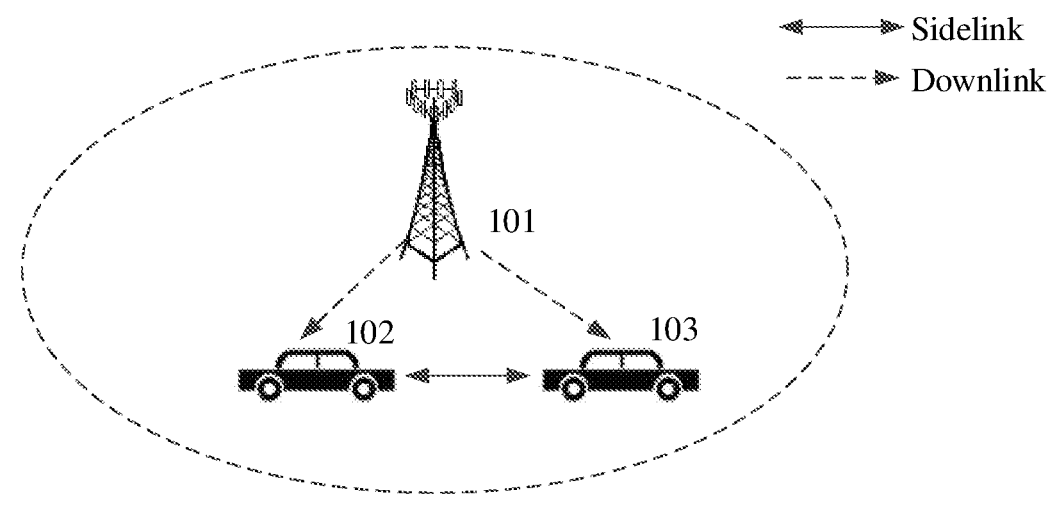
FIG. 1 is a schematic diagram of an application scenario provided by an embodiment of the present application.

Exemplary, FIG. 1 is a schematic diagram of an application scenario provided by an embodiment of the present application. The communication system shown in FIG. 1 includes a network device 101 and two terminal devices, respectively a terminal device 102 and a terminal device 103, both of which are within the coverage of the network device 101. The network device 101 is communicatively connected to the terminal device 102 and the terminal device 103 respectively, and the terminal device 102 is communicatively connected to the terminal device 103. Exemplary, the terminal device 102 may transmit a communication message to the terminal device 103 through the network device 101, and the terminal device 102 may also transmit a communication message directly to the terminal device 103. Herein, the link for direct communication between the terminal device 102 and the terminal device 103 is referred to as a device-to-device (D2D) link, and may also be referred to as a proximity service (ProSe) link, a sidelink link, and the like. Transmission resources on the D2D link may be allocated by the network device.

Figure 2:
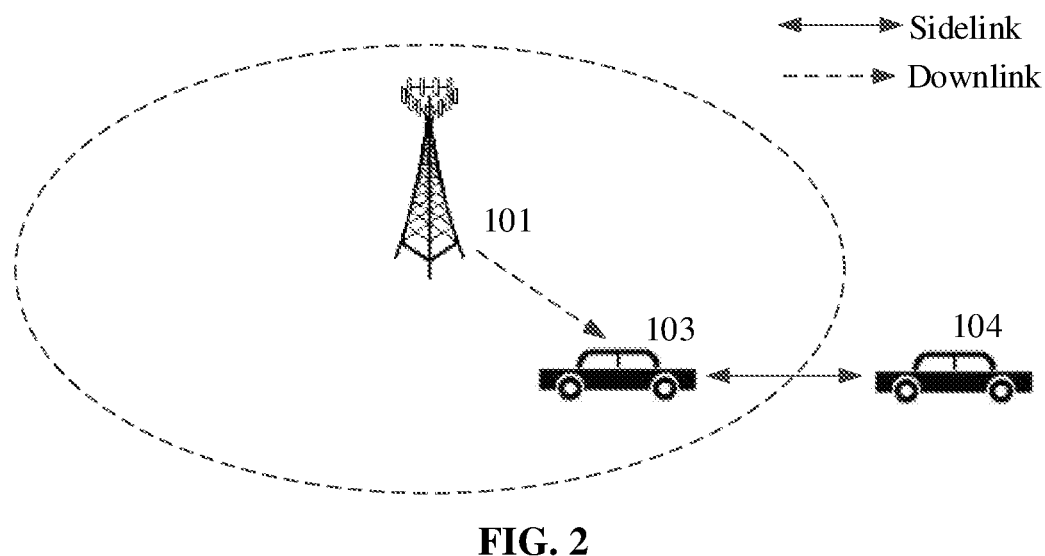
FIG. 2 is a schematic diagram of an application scenario provided by an embodiment of the present application.

Exemplary, FIG. 2 is a schematic diagram of an application scenario provided by an embodiment of the present application. The communication system shown in FIG. 2 likewise includes a network device 101 and two terminal devices. Unlike FIG. 1, the terminal device 103 is within the coverage of the network device 101, and the terminal device 104 is outside the coverage of the network device 101. The network device 101 is communicatively connected to the terminal device 103, and the terminal device 103 is communicatively connected to the terminal device 104. Exemplary, the terminal device 103 may receive configuration information transmitted by the network device 101 and perform sidelink communication according to the configuration information. Since the terminal device 104 cannot receive the configuration information transmitted by the network device 101, the terminal device 104 may perform the sidelink communication according to pre-configuration information and information carried in the Physical Sidelink Broadcast Channel (PSBCH) transmitted by the terminal device 103.

Figure 3:
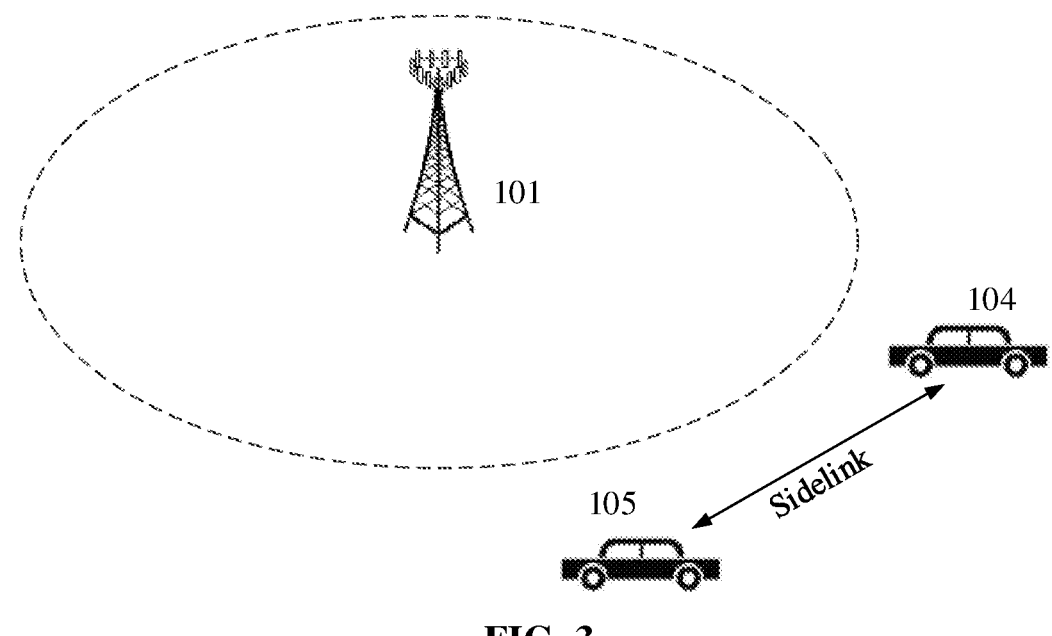
FIG. 3 is a schematic diagram of an application scenario provided by an embodiment of the present application.

Exemplary, FIG. 3 is a schematic diagram of an application scenario provided by an embodiment of the present application. The terminal device 104 and the terminal device 105 shown in FIG. 3 are both outside the coverage of the network device 101. Both the terminal device 104 and the terminal device 105 may determine the sidelink configuration according to the pre-configuration information and perform the sidelink communication.

The terminal device related to the embodiment of the present application may also be referred to as a terminal, which may be a device with wireless transceiver function, which may be deployed on land, including indoor or outdoor, hand-held or vehicle-mounted; may be deployed on the water (such as ships, etc.); may also be deployed in the air (such as airplanes, balloons and satellites, etc.). The terminal device may be a user equipment (UE), where the UE includes a hand-held device, a vehicle-mounted device, a wearable device or a computing device with wireless communication function. Exemplary, the UE may be a mobile phone, a tablet computer, or a computer with wireless transceiver function. The terminal device may also be a virtual reality (VR) terminal device, an augmented reality (AR) terminal device, a wireless terminal in industrial control, a wireless terminal in unmanned driving, a wireless terminal in telemedicine, a wireless terminal in smart grid, a wireless terminal in smart city, a wireless terminal in smart home, etc. In the embodiments of the present application, an apparatus for realizing the function of the terminal may be a terminal; or may also be an apparatus capable of supporting the terminal to realize the function (such as a chip system), which may be installed in the terminal. In the embodiments of the present application, the chip system may be composed of chips or may include chips and other discrete devices.

The network device related in the embodiments of the present application includes a base station (BS), which may be a device deployed in a radio access network capable of wireless communicating with the terminal. Herein, there may be many forms of the base station, such as macro base stations, micro base stations, relay stations and access points, etc. Exemplary, the base station related in the embodiments of the present application may be a base station in 5th generation mobile networks (5G) or a base station in LTE, where the base station in 5G may also be referred to as a transmission reception point (TRP) or a gNB. In the embodiments of the present application, an apparatus for realizing the function of the network device may be a network device; or may also be an apparatus capable of supporting the network device to realize the function (such as a chip system), which may be installed in the network device.

The technical solution in the embodiments of the present application is mainly applied to communication systems based on NR technology, such as 5G communication systems, NR-V2X, NR-V2V communication systems and the like, or may also be applied to other communication systems as long as there is resource scheduling between entities in the communication system. For example, the technical solution in the embodiments of the present application may be applied in resource scheduling between network device and the terminal device, resource scheduling between two terminal devices in which one terminal device undertakes the function of an accessed network, etc.

It should be noted that the system architecture and application scenarios described in the embodiments of the present application are intended to more clearly explain the technical solution of the embodiments of the present application, and do not constitute a limitation to the technical solution provided by the embodiments of the present application. Ordinarily skilled in the art can see that the technical solution provided by the embodiments of the present application is equally applicable to similar problems with the evolution of the network architecture and the emergence of new business scenarios.

For the sidelink communication, two transmission modes are defined in the 3GPP protocol: a first transmission mode and a second transmission mode.

For the first transmission mode, the transmission resources of the terminal device are allocated by the base station, and the terminal device performs data transmission on the sidelink according to the resources allocated by the base station. The base station may allocate resources for single transmission to the terminal device, or may allocate resources for semi-static transmission to the terminal device.

Exemplary, in FIG. 1, the terminal device 102 is located within the coverage of the network device 101, and the network device 101 allocates transmission resources for sidelink transmission to the terminal device 102.

For the second transmission mode, (1) If the terminal device has listening capability, it can transmit data in a manner of listening and reserving or in a manner of randomly selecting resources. Specifically, the above manner of listening and reserving refers to that the terminal device may obtain an available resource set through listening from a resource pool configured or pre-configured by the network, and randomly select a resource from the available resource set for data transmission. (2) If the terminal device has no listening capability, it may randomly select transmission resources from the resource pool.

The above listening refers to that the terminal device receives first sidelink control information transmitted by other terminal devices, acquires resources reserved by other terminal devices according to an indication in the first sidelink control information, and excludes resources reserved for other terminal devices during resource selection to avoid resource collision with other terminal devices.

Exemplary, the terminal device 102 shown in FIG. 1 may autonomously select transmission resources for sidelink transmission from a resource pool configured by the network. The terminal devices 104 and 105 shown in FIG. 3 are both located outside the coverage of the network device 101, and the terminal devices 104 and 105 may autonomously select transmission resources for sidelink transmission from a pre-configured resource pool.

NR-V2X is a communication scenario in which the communication is performed based on a sidelink. In NR-V2X communication, X can generally refer to any device with wireless receiving and transmitting capabilities, including but not limited to slow-moving wireless apparatuses, fast-moving vehicle-mounted devices, network control nodes with wireless transmitting and receiving capabilities, etc. The NR-V2X communication supports unicast, multicast and broadcast transmission modes. For unicast transmission, the transmitting terminal transmits data, and there is only one receiving terminal. For multicast transmission, the transmitting terminal transmits data, and the receiving terminal is all terminals in a communication group or all terminals within a certain transmission distance. For broadcast transmission, the transmitting terminal transmits data, and the receiving terminal is any terminal around the transmitting terminal.

Similar to NR Uu interface, sidelink bandwidth part (SL BWP) configuration is also supported on NR-V2X carrier. Since there are broadcast and multicast services in sidelink communication, one UE needs to transmit sidelink signals to multiple receiving UEs, and one UE may also need to receive sidelink signals transmitted by multiple UEs at the same time. On one carrier, at most one SL BWP can be configured, and the SL BWP is applied to both sidelink transmitting and sidelink receiving.

The configuration of a Resource Pool (RP) also exists in the NR-V2X, and the resource pool defines the time-frequency resource range for sidelink communication. The minimum time domain granularity for resource pool configuration is one time slot, and the resource pool may contain discontinuous time slots in time. The minimum frequency domain granularity for resource pool configuration is a Sub-channel, which is continuous multiple Physical Resource Blocks (PRB) in the frequency domain. In the NR-V2X, one sub-channel may be 10, 12, 15, 20, 25, 50, 75 or 100 PRBs.

Figure 4:
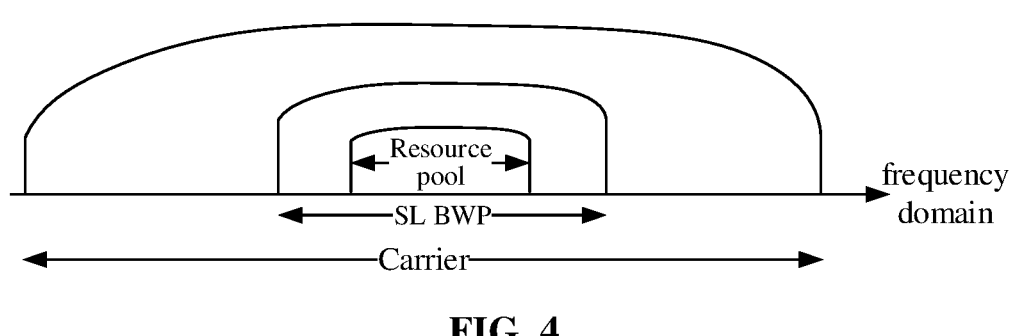
FIG. 4 is a schematic diagram of the relationship among a carrier, a SL BWP and a resource pool provided by an embodiment of the present application.

Exemplary, FIG. 4 is a schematic diagram of the relationship among a carrier, a SL BWP and a resource pool provided by an embodiment of the present application. As shown in FIG. 4, the carrier includes at least one SL BWP (FIG. 4 shows only one SL BWP), which includes at least one resource pool (FIG. 4 shows only one resource pool).

The time slot structure in NR-V2X communication is described in detail below.

Figures 5, 6:
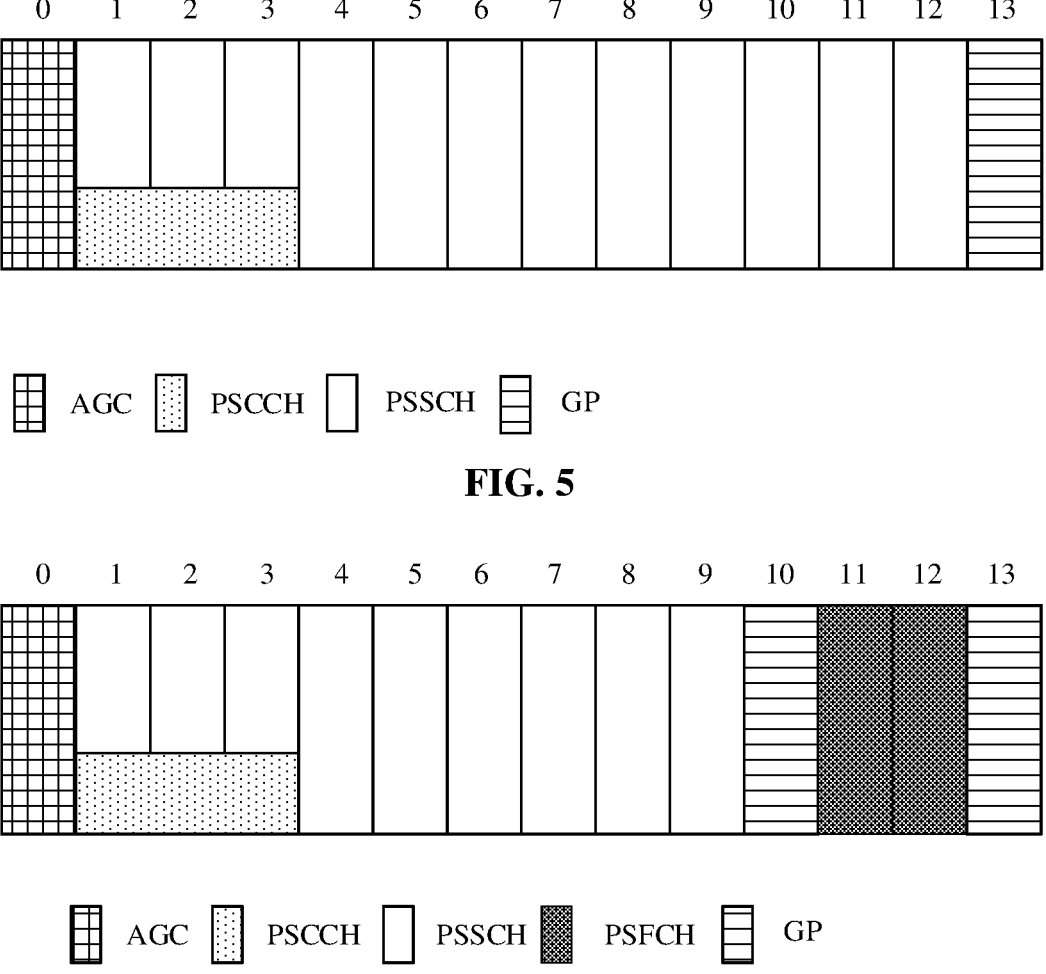
FIG. 5 is a first schematic diagram of a time slot structure of sidelink communication provided by an embodiment of the present application.
FIG. 6 is a second schematic diagram of a time slot structure of sidelink communication provided by an embodiment of the present application.

Exemplary, FIG. 5 is a first schematic diagram of a time slot structure for sidelink communication provided by an embodiment of the present application. As shown in FIG. 5, the time slot does not include symbols for the physical sidelink feedback channel (PSFCH). The first sidelink symbol in the time slot is usually used for Automatic Gain Control (AGC). In a AGC symbol, the terminal device copies the data transmitted in the second symbol, and the data in the AGC symbol is usually not used for data demodulation. The last sidelink symbol of the time slot is a Guard Period (GP), which is used for transmitting-to-receiving transition, that is, the GP is used for the terminal device to transform from a transmitting (or receiving) state to a receiving (or transmitting) state. Among the remaining sidelink symbols of the time slot, the physical sidelink control channel (PSCCH) may occupy two or three OFDM symbols starting from the second sidelink symbol, and the PSCCH may occupy {10, 12, 15, 20, 25} PRBs in the frequency domain. In order to reduce the complexity of blind detection for the PSCCH by the terminal device, only one PSCCH symbol number and PRB number can be configured in a resource pool. In addition, since the sub-channel is the minimum granularity of PSSCH resource allocation in NR-V2X, the number of PRBs occupied by PSCCH must be less than or equal to the number of PRBs contained in a sub-channel in the resource pool, so as to avoid additional restrictions on PSSCH resource selection or allocation. The physical sidelink shared channel (PSSCH) may occupy symbols beginning with the second sidelink symbol of the time slot and up to the last GP symbol of the time slot. PSSCH occupies K sub-channels in the frequency domain, and each sub-channel includes M continuous PRBs.

Exemplary, FIG. 6 is a second schematic diagram of a time slot structure for sidelink communication provided by an embodiment of the present application. As shown in FIG. 6, unlike FIG. 5, the time slot structure includes time domain symbols for a PSFCH. The second-to-last and third-to-last symbols in the time slot structure are used for transmitting the PSFCH, and the time domain symbol before the third-to-last symbol is used as the GP symbol. Optionally, in some embodiments, in the time slot structure shown in FIG. 6, the data in the third-to-last symbol is the same as the data in the second-to-last symbol, and the third-to-last symbol is used as the AGC.

Figure 7:
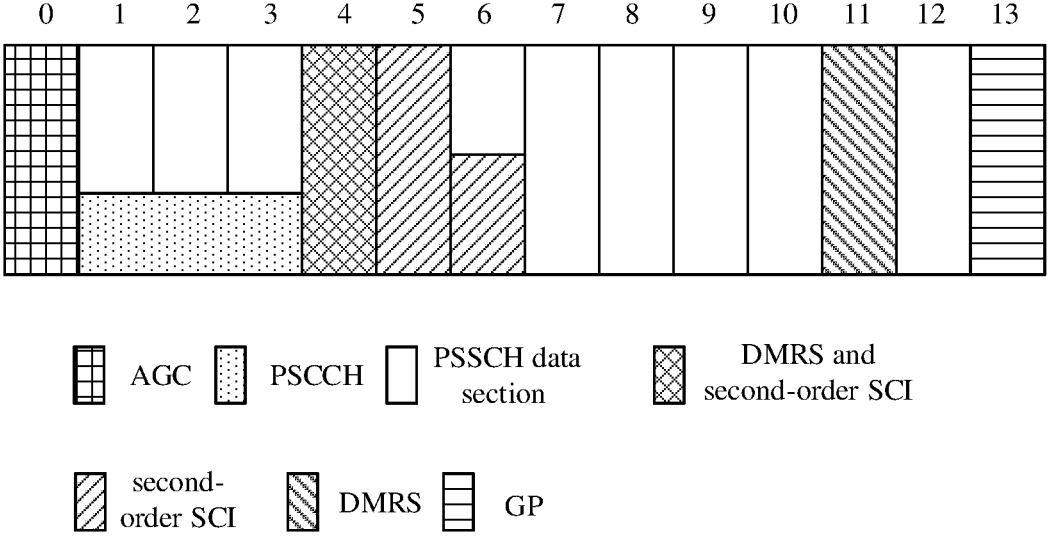
FIG. 7 is a third schematic diagram of a time slot structure of sidelink communication provided by an embodiment of the present application.

In the NR-V2X communication, the second-order Side-link Control Information (SCI) is introduced. The first-order SCI (or referred to as the first sidelink control information) is carried in the PSCCH, and is used to indicate information including the transmission resources of the PSSCH, reserved resource information, Modulation and Coding Scheme (MCS) level, priority and the like. The second-order SCI (or referred to as the second sidelink control information) is carried in the PSSCH, and is used to indicate information for data demodulation, including source ID, destination ID, hybrid automatic retransmission HARQ ID, new data indication NDI and the like. The terminal device utilizes the Demodulation Reference Signal (DMRS) for the PSSCH to demodulate, and the second-order SCI is mapped from the first DMRS symbol for the PSSCH, first in frequency domain and then in time domain. Exemplary, FIG. 7 is a third schematic diagram of a time slot structure of sidelink communication provided by an embodiment of the present application. As shown in FIG. 7, the PSCCH occupies three symbols, such as symbols 1, 2 and 3 in FIG. 7. The DMRS for the PSSCH occupies symbols 4 and 11, the second-order SCI is mapped from symbol 4 and frequency division multiplexed with DMRS on the symbol 4. The second-order SCI is mapped to symbols 4, 5 and 6, and the size of resources occupied by the second-order SCI depends on the number of bits of the second-order SCI.

The NR-V2X communication needs to support automatic driving, so higher requirements are put forward for data interaction between vehicles, such as higher throughput, lower delay, higher reliability, larger coverage and more flexible resource allocation, etc. In order to improve the reliability of communication, the Physical Sidelink Feed-back Channel (PSFCH) is introduced into the NR-V2X.

For unicast transmission, the transmitting terminal trans-mits sidelink data including a Physical Sidelink Control Channel (PSCCH) and a Physical Sidelink Shared Channel (PSSCH) to the receiving terminal. The receiving terminal transmits feedback information of a Hybrid Automatic Repeat reQuest (HARQ) to the transmitting terminal, and the transmitting terminal determines whether data retrans-mission is required according to the feedback information from the receiving terminal. The feedback information of the HARQ is carried in the PSFCH.

The terminal device may activate or deactivate the side-link feedback through pre-configuration information or information configured by a network. If the sidelink feed-back is activated, the receiving terminal receives the sidelink data transmitted by the transmitting terminal, and needs to feedback HARQ acknowledgement/non-acknowledgement (ACK/NACK) to the transmitting terminal according to the detection result. The transmitting terminal decides to trans-mit retransmission data or new data according to the feed-back information from the receiving terminal. If the sidelink feedback is deactivated, the receiving terminal does not need to transmit the feedback information, and the transmitting terminal usually transmits data by blind retransmission. For example, the transmitting terminal repeatedly transmits each sidelink data for preset retransmission times.

At present, in the NR-V2X communication, the PSFCH only carries 1 bit of HARQ ACK information, which occu-pies 2 time domain symbols in time domain (where the second symbol carries sidelink feedback information, the data on the first symbol is a copy of the data on the second symbol, and the first symbol is used as AGC), and 1 PRB in frequency domain. The schematic diagram of the position of the PSFCH in a time slot structure may be seen in FIG. 6.

For multicast transmission, the following two sidelink feedback manners are supported:

Manner 1: The terminal within a certain distance range receives the sidelink data from the transmitting termi-nal, and if the detection result is NACK, then it needs to transmit a sidelink feedback; if the detection result is ACK, then it does not need to transmit a sidelink feedback. The terminal outside the distance range does not need to transmit a sidelink feedback regardless of the detection result.

Manner 2: for a communication group, all receiving terminals need to transmit the side feedback. For example, a communication group includes P terminals, and when one terminal transmits sidelink data as a transmitting terminal, all of the other P−1 terminals need to transmit sidelink feedback information.

In order to reduce the overhead of the PSFCH channel, the period of the sidelink feedback resources may be defined. For example, the period is N time slots, N takes 1, 2, 4, etc., and the parameter N may be pre-configured or configured by the network.

Figure 8:
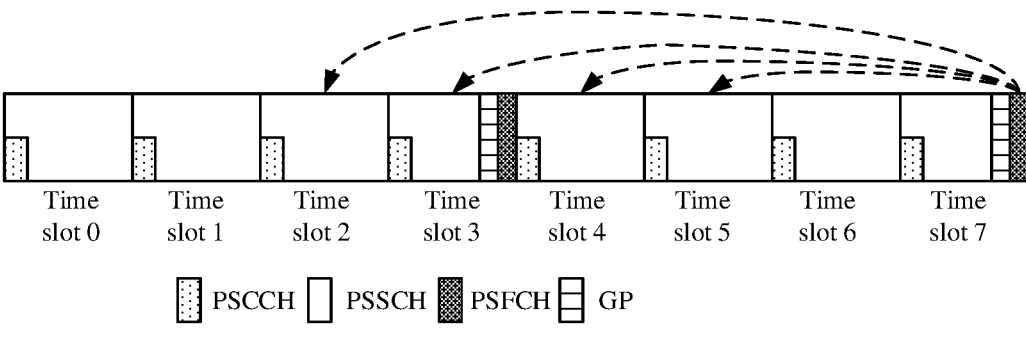
FIG. 8 is a schematic diagram of a PSFCH resource provided by an embodiment of the present application.

Exemplary, FIG. 8 is a schematic diagram of PSFCH resources provided by an embodiment of the present appli-cation. As shown in FIG. 8, the period of the PSFCHs is 4 time slots. The feedback information of the PSSCH trans-mitted in time slots 2, 3, 4 and 5 is transmitted in time slot 7. Therefore, time slots 2, 3, 4 and 5 may be regarded as a time slot set. The PSFCH corresponding to the PSSCH transmitted in this time slot set is in the same time slot (time slot 7).

Figure 9:
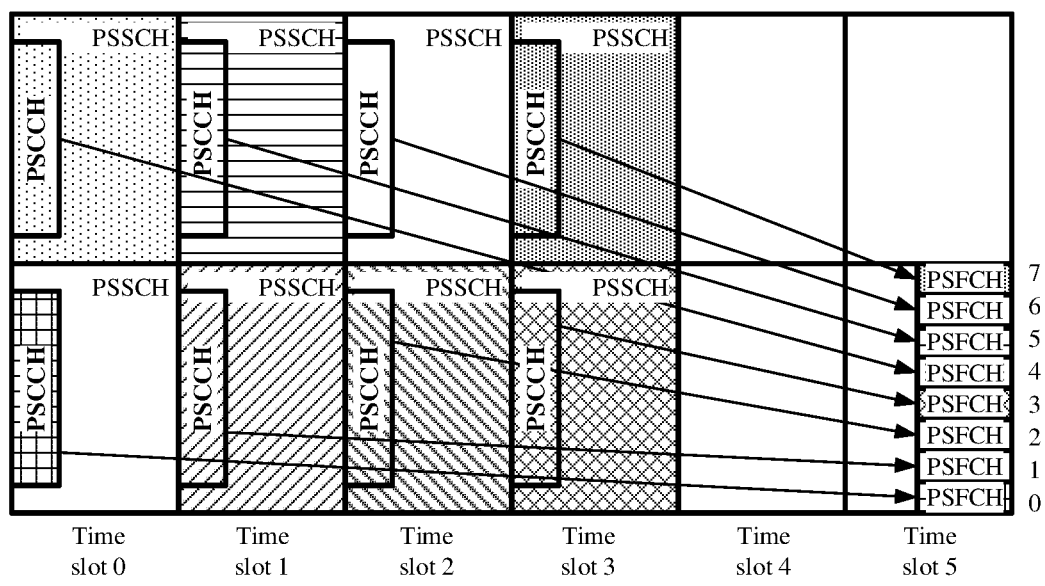
FIG. 9 is a schematic diagram of the corresponding relationship between transmission resources of PSFCH and PSSCH provided by an embodiment of the present application.

The resources for the sidelink feedback information may be determined according to the time slot in which the sidelink data PSSCH is located and the starting position of the occupied subband. Exemplary, FIG. 9 is a schematic diagram of the corresponding relationship between trans-mission resources for the PSFCH and PSSCH provided by an embodiment of the present application. As shown in FIG. 9, the period of the PSFCHs is 4 time slots, and PSSCHs transmitted at the same subband start position in different time slots respectively correspond to different PSFCH resources in a feedback time slot.

In the current protocol, the configuration information of SL-ResourcePool includes: the transmission resources for the PSCCH/PSSCH and the transmission resources for the PSFCH. The transmitting terminal transmits the PSCCH/PSSCH in the transmitting resource pool configured for the transmitting terminal. The receiving terminal detects whether there is a PSCCH/PSSCH transmitted by other terminals in a receiving resource pool configured for the receiving terminal. If the PSCCH/PSSCH has detected, the receiving terminal determines the transmission resource for transmitting the PSFCH according to the transmission resource for the PSCCH/PSSCH and the configuration infor-mation of the PSFCH in the receiving resource pool. After transmitting the PSCCH/PSSCH, the transmitting terminal may determine the resources for receiving the PSFCH according to the PSFCH configuration information in the transmitting resource pool, and perform the detection of the PSFCH. In order to enable the transmitting terminal and the receiving terminal to normally perform data transmission, the transmitting resource pool configured for the transmit-ting terminal is generally the same as the receiving resource pool configured for the receiving terminal, so that the transmitting terminal and the receiving terminal may deter-mine the same PSFCH transmission resource according to the PSSCH transmission resource and the PSFCH configuration information in the respective resource pool.

In order to improve the throughput of the sidelink transmission system, multi-carrier transmission may be supported on the sidelink link. In Rel-15 vehicle networking system, multi-carrier transmission solution is introduced. The data of the terminal may be transmitted on one or more carriers, so there is a problem of selecting transmission carriers. One manner is to select, according to a channel busy ratio (CBR) of each carrier, a carrier with the lowest CBR for data transmission. The CBR reflects the channel occupancy in the past 100 ms or 100 time slots: the lower CBR, the lower the system resource occupancy rate and the more available resources; the higher the CBR, the higher the system resource occupancy rate, the more the congestion, and the transmission collision and interference are easy to occur.

If sidelink multi-carrier transmission is introduced in an NR SL system, the transmitting terminal transmits the PSCCH/PSSCH on multiple carriers. For each carrier transmitting the PSCCH/PSSCH, the transmitting terminal transmits the PSCCH/PSSCH in the transmitting resource pool for the transmitting terminal. The receiving terminal detects the PSCCH/PSSCH transmitted by other terminals in the receiving resource pool for the receiving terminal, and if the PSCCH/PSSCH is detected, the receiving terminal transmits the PSFCH. If the receiving terminal detects the PSCCH/PSSCH on multiple carriers, it may transmit the PSFCH on one carrier or multiple carriers, and the carrier on which the PSFCH is transmitted and the carrier on which the PSCCH/PSSCH is detected may be the same carrier or different carrier. As this time, how the receiving terminal determines the resource pool for transmitting the PSFCH from multiple carriers is an urgent problem to be solved at present.

In order to solve the above problem, the embodiments of the present application provide a resource selection solution for determining the resources for transmitting the PSFCH. This solution mainly aims at a scenario of multi-carrier transmission for sidelink. That is, the transmitting terminal may transmit the same or different sidelink data at a same moment or at different moments, and the transmitting terminal may also transmit the above sidelink data on multiple carriers. Accordingly, the receiving terminal can receive the sidelink data on multiple carriers at a same moment or at different moments. For the above sidelink data, the receiving terminal transmits sidelink feedback information carried in the PSFCH, and the receiving terminal may transmit the PSFCH on one or more carriers. Sidelink feedback information corresponding to multiple sidelink data may be carried on a PSFCH, or sidelink feedback information corresponding to each sidelink data may be carried in a separate PSFCH respectively.

Figure 10:
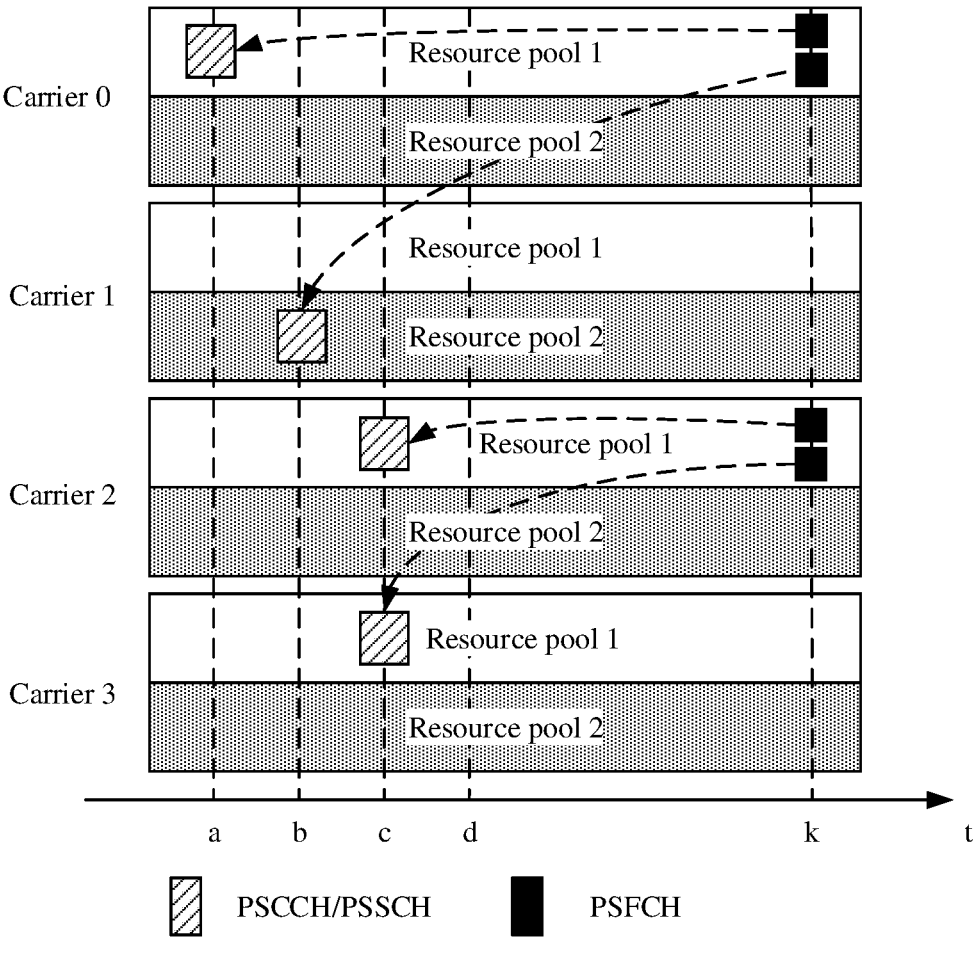
FIG. 10 is a first schematic diagram of a PSFCH and multi-carrier transmission of PSCCH/PSSCH provided by an embodiment of the present application.

Exemplary, FIG. 10 is a first schematic diagram of PSFCHs and multi-carrier transmission of the PSCCH/PSSCH provided by an embodiment of the present application. As shown in FIG. 10, a sidelink communication system is configured with 4 sidelink carriers, namely carriers 0-3. Each carrier includes 2 transmitting resource pools, and each transmitting resource pool corresponds to a receiving resource pool. Therefore, each carrier may have two receiving resource pools. The transmitting terminal transmits the PSCCH/PSSCH on time slots a, b, c and d, and the corresponding PSFCHs are all on time slot k. That is, the feedback time slot k corresponds to the time slot set {a, b, c, d} for PSSCH.

In FIG. 10, the transmitting terminal transmits sidelink data on 4 carriers in time slots a, b and c respectively. The transmitting terminal utilizes multiple carriers to transmit sidelink data. The transmitting terminal may transmit sidelink data on multiple carriers at the same moment. For example, the transmitting terminal transmits sidelink data on carrier 2 and carrier 3 in time slot c at the same time. The transmitting terminal may also transmit sidelink data on multiple carriers at different moments. For example, the transmitting terminal transmits sidelink data on carrier 0 in time slot a and transmits sidelink data on carrier 1 in time slot b. In addition, it should be noted that the same sidelink data (e.g. different redundant versions of the same Transmission Block (TB)) may be transmitted on multiple carriers, and different sidelink data may also be transmitted on multiple carriers, which is not limited in the embodiments of the present application.

Each PSCCH/PSSCH in FIG. 10 corresponds to a PSFCH respectively.

In FIG. 10, the receiving terminal transmits sidelink feedback information for sidelink data on time slots a, b and c in time slot k. The receiving terminal may transmit the PSFCH on one or more carriers.

In an optional implementation, the receiving terminal may transmit the PSFCHs on two carriers, such as transmit the PSFCHs on carrier 0 and carrier 2. As shown in FIG. 10, the transmitting terminal transmits the PSCCH/PSSCH using carrier 0 in time slot a and carrier 1 in time slot b, and the corresponding PSFCHs are both located at carrier 0. The transmitting terminal transmits the PSCCH/PSSCH using carrier 2 and carrier 3 in time slot c at the same time, and the corresponding PSFCHs are both located at carrier 2.

In another optional implementation, the receiving terminal may carry the sidelink feedback information of all sidelink data in one PSFCH, in which case the receiving terminal only needs to transmit one PSFCH in time slot k, for example, the receiving terminal only transmits one PSFCH on carrier 0 in time slot k.

Based on the above transmission solutions, the present application proposes the following several resource selection solutions:

Solution 1, the receiving terminal selects a resource pool for transmitting the PSFCH according to the resource pool in which the sidelink data is located.

Solution 2, the receiving terminal selects a resource pool for transmitting the PSFCH according to PSFCH configuration information. The PSFCH configuration information includes at least one of information for configuring a PSFCH format and information for configuring a PSFCH transmission resource.

Solution 3, the receiving terminal selects a resource pool for transmitting the PFSCH according to measurement information of the resource pools. The measurement information of the resource pools includes a CBR measurement result of the resource pools.

Solution 4, the receiving terminal selects a resource pool for transmitting the PFSCH according to the first indication information from other devices. Herein, other devices may be transmitting terminals or network devices.

In practical application, besides determining the resource for transmitting the PSFCH based on any one of the above solutions, the resource pool for transmitting the PSFCH may also be determined through any combination of the above several solutions:

Solution 1, the receiving terminal selects a resource pool for transmitting the PSFCH according to the resource pool in which the sidelink data is located, and the PSFCH configuration information of the resource pool in which the sidelink data is located.

Solution 2, the receiving terminal selects a resource pool for transmitting the PSFCH according to the resource pool in which the sidelink data is located, and the measurement information of the resource pool in which the sidelink data is located.

Solution 3, the receiving terminal selects a resource pool for transmitting the PSFCH according to the resource pool in which the sidelink data is located, and the first indication information from other devices. That is, a resource pool indicated by the first indication information and belonging to the resource pool in which the sidelink data is located is selected as the resource pool for transmitting the PSFCH.

The reasonable selection of the transmission resources for the sidelink feedback information in the sidelink multi-carrier transmission can be achieved by any of the above resource selection solutions proposed by the present application, which improves the transmission performance of the sidelink communication, and reduces the transmission conflict and interference of the sidelink communication.

The technical solution provided by the embodiments of the present application is described in detail by specific embodiments below. It should be noted that the technical solution provided by the embodiments of the present application may include some or all of the following contents, the following specific embodiments may be combined with each other, and the same or similar concepts or processes may not be repeated in some embodiments.

FIG. 11 is a first flowchart of a resource selection method provided by an embodiment of the present application. As shown in FIG. 11, the resource selection method provided by the present embodiment includes the operations 10-11.

In operation 10, a first terminal receives sidelink data from a second terminal on multiple carriers.

In operation 11, the first terminal determines a resource pool for transmitting a PSFCH from the multiple carriers.

The first terminal is a sidelink data receiving terminal in the sidelink, and the second terminal is a sidelink data transmitting terminal in the sidelink.

In an embodiment of the present application, the multiple carriers include any one of the following:

all carriers available for the sidelink transmission; carriers available for the first terminal to carry out the sidelink transmission; carriers available for the second terminal to carry out the sidelink transmission; or carriers on which the first terminal receives the sidelink data from the second terminal. Herein, the sidelink transmission includes sidelink transmitting or sidelink receiving.

In an embodiment of the present application, the sidelink data includes PSCCH and PSSCH.

In an embodiment of the present application, the sidelink data received by the first terminal on multiple carriers may be the same sidelink data or different sidelink data, which is not limited in the embodiments of the present application. That is, the sidelink data received by the first terminal on multiple carriers belong to a same Transport Block (TB) or different transport blocks. Herein, the same transport block may correspond to different Redundancy versions (RV). For example, the first terminal receives a sidelink transport block 1 on a carrier 0 and a carrier 1, respectively, and the carrier 0 and the carrier 1 correspond respectively to redundant version 0 and redundant version 2 of the sidelink transport block 1. For another example, the first terminal receives a sidelink transport block 1 on a carrier 0 and receives a sidelink transport block 2 on a carrier 2.

In an embodiment of the present application, the sidelink data received by the first terminal from the second terminal on multiple carriers includes: sidelink data transmitted by the second terminal at the same moment, and/or sidelink data transmitted by the second terminal at different moments. Specifically, the first terminal may receive sidelink data on different carriers at the same moment, or may receive sidelink data on the same carrier or different carriers at different moments, which is not limited by the embodiments of the present application. For example, the first terminal receives sidelink data 1 on carrier 0 in time slot a, and receives sidelink data 2 on carrier 1 at the same time. For another example, the first terminal receives sidelink data 1 on carrier 0 in time slot a, and receives sidelink data 1 on carrier 0 in time slot b. For another example, the first terminal receives sidelink data 1 on carrier 0 in time slot a, and receives sidelink data 2 on carrier 1 in time slot b.

In an embodiment of the present application, sidelink feedback information corresponding to the sidelink data received by the first terminal from the second terminal on the multiple carriers is carried on one PSFCH.

In an embodiment of the present application, the sidelink feedback information corresponding to the sidelink data received by the first terminal from the second terminal on the multiple carriers is carried on different PSFCHs.

In an embodiment of the present application, the resource pool in which the first sidelink data received by the first terminal from the second terminal on the multiple carriers is located and the resource pool in which the PSFCH corresponding to the first sidelink data is transmitted are different resource pools.

Herein, the first sidelink data is sidelink data received by the first terminal from the second terminal on one of the multiple carriers.

Exemplary, the first terminal transmits the PSSCH on carrier 0 and carrier 1, and the PSFCH corresponding to the PSSCHs on carrier 0 and carrier 1 is transmitted on carrier 1, then the resource pool in which the sidelink data received on carrier 0 is located and the resource pool in which the PSFCH is transmitted are different resource pools.

In an embodiment of the present application, the carrier on which the first sidelink data is located and the carrier on which the PSFCH corresponding to the first sidelink data is transmitted are different carriers.

In an embodiment of the present application, the resource pool in which the first sidelink data received by the first terminal from the second terminal on the multiple carriers and the resource pool in which the PSFCH corresponding to the first sidelink data is transmitted are the same resource pool.

In an embodiment of the present application, the carrier in which the first sidelink data is located and the carrier on which the PSFCH corresponding to the first sidelink data is transmitted are the same carrier.

In an embodiment of the present application, the resource pool in which the first sidelink data received by the first terminal from the second terminal on the multiple carriers is located and the resource pool in which the PSFCH corresponding to the first sidelink data is transmitted are the same resource pool, and the carrier on which the first sidelink data is located and the carrier on which the PSFCH corresponding to the first sidelink data is transmitted are the same carrier.

In the above embodiments, the first terminal receives the sidelink data from the second terminal on the multiple carriers, and the multiple carriers for receiving the sidelink data may be multiple carriers among all the carriers used for sidelink transmission, may be multiple carriers of all the carriers used for sidelink transmission by the second terminal, or may be multiple carriers among all the carriers used for sidelink transmission by the first terminal.

As can be seen from the above embodiments, the first terminal may determine a resource pool for transmitting the PSFCH from all carriers available for sidelink transmission, or all carriers available for the first terminal to perform sidelink transmission, or all carriers available for the second terminal to perform sidelink transmission, or multiple carriers on which the sidelink data received from the second terminal by the first terminal is located.

The transmission resources for the sidelink feedback information in the sidelink multi-carrier transmission may be selected reasonably by the above solutions, which improves the transmission performance of the sidelink communication, and reduces the transmission conflict and interference of the sidelink communication.

FIG. 12 is a second flowchart of a resource selection method provided by an embodiment of the present application. As shown in FIG. 12, the resource selection method provided by the present embodiment includes the operations 101-102.

In operation 101, a first terminal receives sidelink data from a second terminal on multiple carriers.

In operation 102, the first terminal determines, according to a resource pool in which the sidelink data is located, a resource pool for transmitting a PSFCH from the multiple carriers.

In an embodiment of the present application, the operation that the first terminal determines, according to the resource pool in which the sidelink data is located, the resource pool for transmitting the PSFCH from the multiple carriers include operation that the first terminal obtains at least one resource pool in which a PSCCH or PSSCH received on the multiple carriers from the second terminal is located, and determines the resource pool for transmitting the PSFCH from the at least one resource pool.

Optionally, when the first terminal receives the sidelink data from the second terminal on the multiple carriers, a first carrier for transmitting the PSFCH may be determined from the multiple carriers first, then at least one resource pool in which the sidelink data is located is acquired, and the resource pool corresponding to the at least one resource pool in which the sidelink data is located is selected from the first carrier as the resource pool for transmitting the PSFCH.

Herein, the first terminal may determine the first carrier for transmitting the PSFCH from the multiple carriers in the following implementations.

In an optional implementation, the first terminal may select a carrier with the lowest CBR from the multiple carriers according to CBRs of the carriers as the first carrier for transmitting the PSFCH.

In an optional implementation, the first terminal may determine the first carrier for transmitting the PSFCH according to the first indication information transmitted by another device. Another device includes a second terminal or a network device, and the first indication information may indicate information of carriers on which the first terminal transmits the PSFCH.

In an optional implementation, the first terminal may determine the first carrier for transmitting the PSFCH according to the PSFCH configuration information. The PSFCH configuration information includes at least a set of carriers supported by sidelink transmission, and the set of carriers at least includes carriers for transmitting the PSFCH.

It should be understood that the embodiments of the present application do not make any limitations on the manner of how the first terminal determines the first carrier for transmitting the PSFCH.

Figure 13:
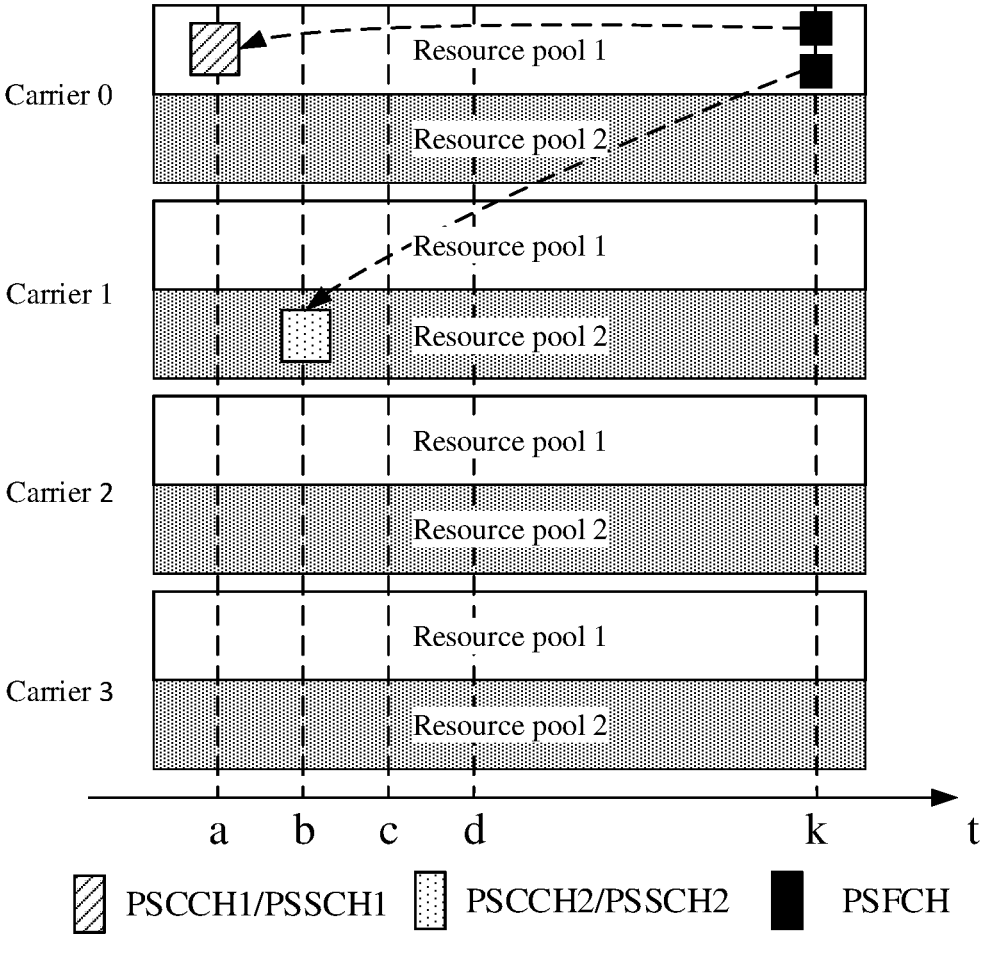
FIG. 13 is a second schematic diagram of a PSFCH and multi-carrier transmission of a PSCCH/PSSCH provided by an embodiment of the present application.

Exemplary, FIG. 13 is a second schematic diagram of a PSFCH and multi-carrier transmission of a PSCCH/PSSCH provided by an embodiment of the present application. As shown in FIG. 13, the transmitting terminal transmits a PSCCH1/PSSCH1 in the resource pool 1 on the carrier 0 in time slot a, and transmits a PSCCH2/PSSCH2 in the resource pool 2 on the carrier 1 in time slot b. The receiving terminal determines to transmit sidelink feedback information for the above two sidelink data on the carrier 0. The sidelink feedback information may be multiplexed with a PSFCH or fed back separately by using independent PSFCH (as shown in FIG. 13). Since the receiving terminal receives the PSCCH1/PSSCH1 transmitted by the transmitting terminal from the resource pool 1, when the receiving terminal determines a resource pool for transmitting the PSFCH on the carrier 0 in time slot k, the resource pool for transmitting the PSFCH may be determined according to the resource pool in which the PSCCH/PSSCH corresponding to the sidelink feedback information to be transmitted in time slot k is located. As shown in FIG. 13, if the receiving terminal needs to transmit 2 PSFCHs in time slot k, which correspond to PSCCH1/PSSCH1 and PSCCH2/PSSCH2 respectively, the receiving terminal determines to transmit the PSFCH on carrier 0, and the PSCCH1/PSSCH1 is received by the receiving terminal in resource pool 1 on carrier 0, the receiving terminal determines to transmit 2 PSFCHs in resource pool 1 on carrier 0.

Figure 14:
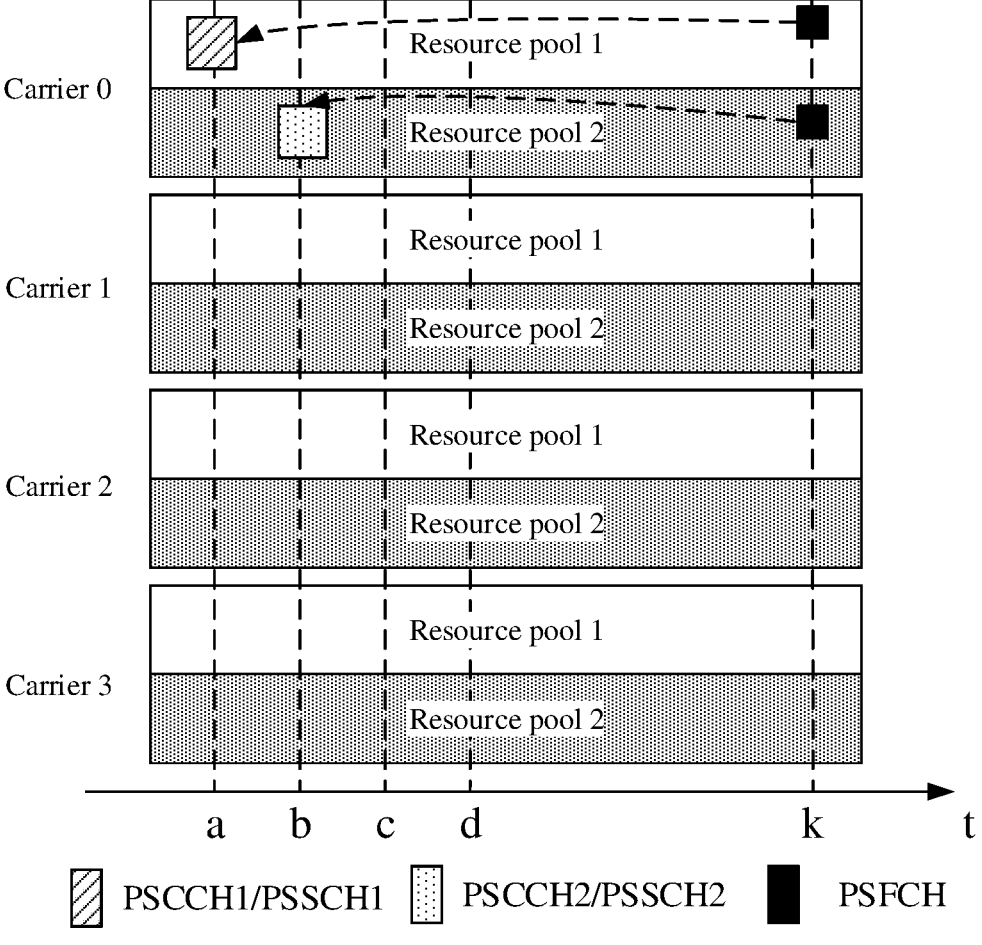
FIG. 14 is a third schematic diagram of a PSFCH and multi-carrier transmission of a PSCCH/PSSCH provided by an embodiment of the present application.

Exemplary, FIG. 14 is a third schematic diagram of a PSFCH and multi-carrier transmission of PSCCH/PSSCH provided by an embodiment of the present application. As shown in FIG. 14, the transmitting terminal transmits a PSCCH1/PSSCH1 in the resource pool 1 on the carrier 0 in time slot a, and transmits a PSCCH2/PSSCH2 in the resource pool 2 on the carrier 0 in time slot b. The receiving terminal determines to transmit sidelink feedback information for the above two sidelink data on the carrier 0. The receiving terminal transmits PSFCHs for two sidelink data respectively to carry respective sidelink feedback information of two sidelink data. At this time, the resource pool of the PSFCH corresponding to each sidelink data may be determined according to the resource pool in which each sidelink data is located. As shown in FIG. 14, the PSFCH corresponding to the PSCCH1/PSSCH1 is transmitted in the resource pool 1 of carrier 0, and the PSFCH corresponding to the PSCCH2/PSSCH2 is transmitted in the resource pool 2 of carrier 0.

In one embodiment of the present application, when the first terminal determines that the resource pool for transmitting the PSFCH is one resource pool, a resource pool for transmitting the PSFCH may be determined from at least one resource pool in the following two implementations.

In an optional implementation, the first terminal determines the resource pool for transmitting the PSFCH from the at least one resource pool according to priority information. Specifically, the first terminal may determine the resource pool for transmitting the PSFCH from the at least one resource pool according to the priority information of the sidelink data. The sidelink control information (SCI) carries the priority information of the sidelink data. The first terminal may select a resource pool in which the sidelink data with the highest priority (or the lowest priority) is located from at least one resource pool, or the first terminal may select a resource pool in which the PSSCH with the highest priority (or the lowest priority) is located from at least one resource pool, and use the resource pool as the resource pool for transmitting the PSFCH.

In an optional implementation, the first terminal determines the resource pool for transmitting the PSFCH from the at least one resource pool according to a chronological order of the received PSCCH or PSSCH. Specifically, the first terminal may determine the resource pool for transmitting the PSFCH from the at least one resource pool according to the receiving time of the sidelink data. The first terminal may use a resource pool in which the first received sidelink data is located as the resource pool for transmitting the PSFCH, or use a resource pool in which the last received sidelink data is located as the resource pool for transmitting the PSFCH.

Figure 15:
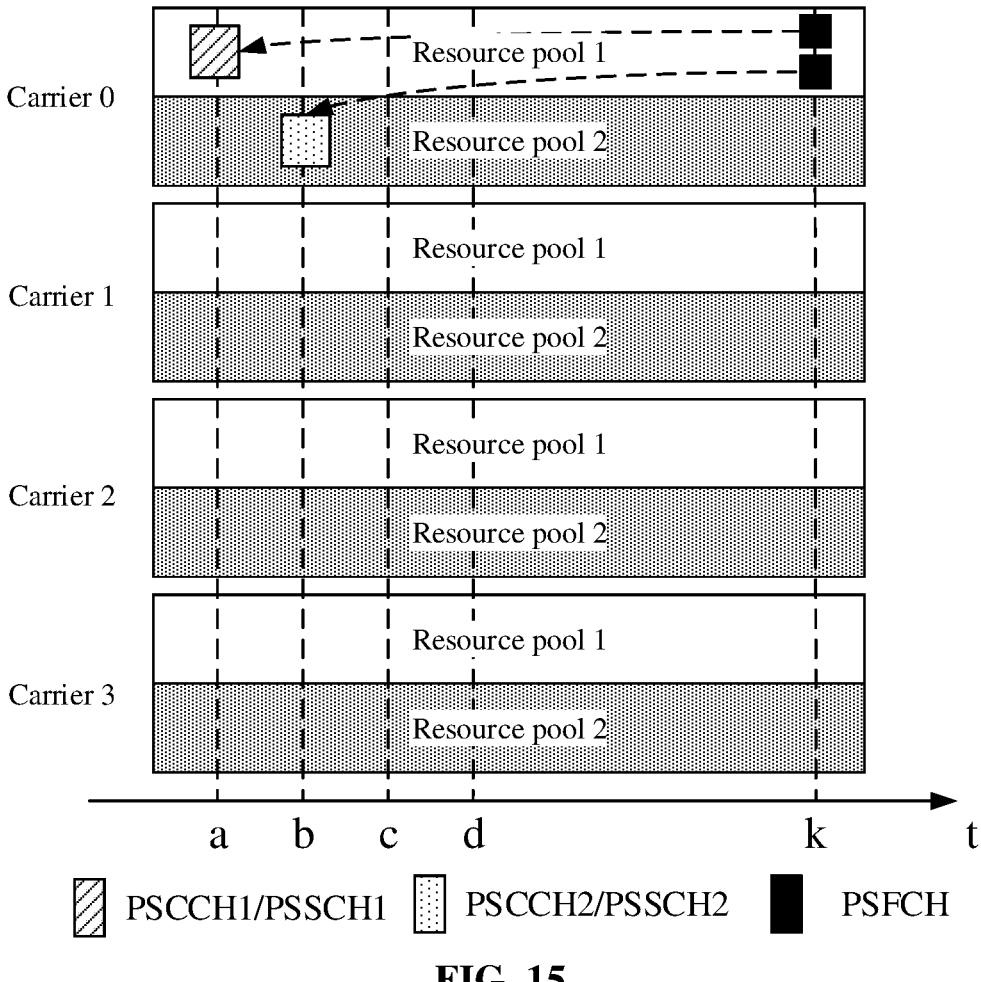
FIG. 15 is a fourth schematic diagram of a PSFCH and multi-carrier transmission of a PSCCH/PSSCH provided by an embodiment of the present application.

Exemplary, FIG. 15 is a fourth schematic diagram of a PSFCH and multi-carrier transmission of a PSCCH/PSSCH provided by an embodiment of the present application. As shown in FIG. 15, the transmitting terminal transmits a PSCCH1/PSSCH1 in the resource pool 1 on the carrier 0 in time slot a, and transmits a PSCCH2/PSSCH2 in the resource pool 2 on the carrier 0 in time slot b. The receiving terminal determines to transmit PSFCHs for the above two sidelink data on the carrier 0.

In one case, as shown in FIG. 15, if the receiving terminal first receives the PSCCH1/PSSCH1 in the resource pool 1 on the carrier 0 and then receives the PSCCH2/PSSCH2 in the resource pool 2 on the carrier 0, the receiving terminal determines the resource pool 1 of the carrier 0 as the resource pool for transmitting the PSFCH. FIG. 15 shows that sidelink feedback information for two sidelink data is carried in two PSFCHs of the resource pool 1 on the carrier 0 respectively. In some embodiments, the sidelink feedback information for two sidelink data may also be carried in one PSFCH in the resource pool 1 of the carrier 0 (not shown).

In another case, if the priority of the sidelink data received by the receiving terminal in the resource pool 1 on the carrier 0 is greater than the priority of the sidelink data received in the resource pool 2 on the carrier 0, the receiving terminal determines the resource pool 1 of the carrier 0 as the resource pool for transmitting the PSFCH. As shown in FIG. 15, sidelink feedback information for two sidelink data is carried in two PSFCHs in the resource pool 1 of the carrier 0 respectively. In some embodiments, the sidelink feedback information for two sidelink data may also be carried in one PSFCH in the resource pool 1 of the carrier 0 (not shown).

In the resource selection method provided by an embodiment of the present application, a first terminal receives sidelink data transmitted from a second terminal on multiple carriers, determines a resource pool for transmitting a PSFCH from multiple carriers in which the sidelink data is located according to a resource pool in which the sidelink data is located. The transmission resources of the sidelink feedback information in the sidelink multi-carrier transmission may be selected reasonably by the above solutions, which improves the transmission performance of the sidelink communication, and reduces the transmission conflict and interference of the sidelink communication.

Figure 16:
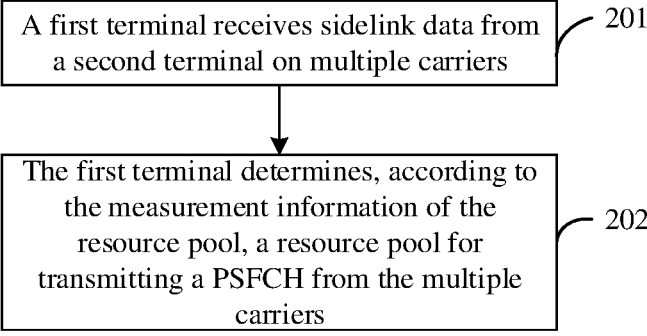
FIG. 16 is a third flow diagram of a resource selection method provided by an embodiment of the present application.

FIG. 16 is a third flowchart of a resource selection method provided by an embodiment of the present application. As shown in FIG. 16, the resource selection method provided by the present embodiment includes the following operations 201-202.

In operation 201, a first terminal receives sidelink data from a second terminal on multiple carriers.

In operation 202, the first terminal determines, according to measurement information of resource pools, a resource pool for transmitting a PSFCH from the multiple carriers.

In an embodiment of the present application, the first terminal may determine the resource pool (and/or carrier) for transmitting the PSFCH according to measurement result of a resource pool (and/or carrier) in which a received PSCCH/PSSCH is located.

In an embodiment of the present application, the measurement information of the resource pools includes channel busy ratios (CBRs) of the resource pools.

In an embodiment of the present application, the first terminal may select, according to CBRs of resource pools, the resource pool for transmitting the PSFCH from a resource pool set of the multiple carriers in an order of CBRs from low to high.

Figures 17, 18:
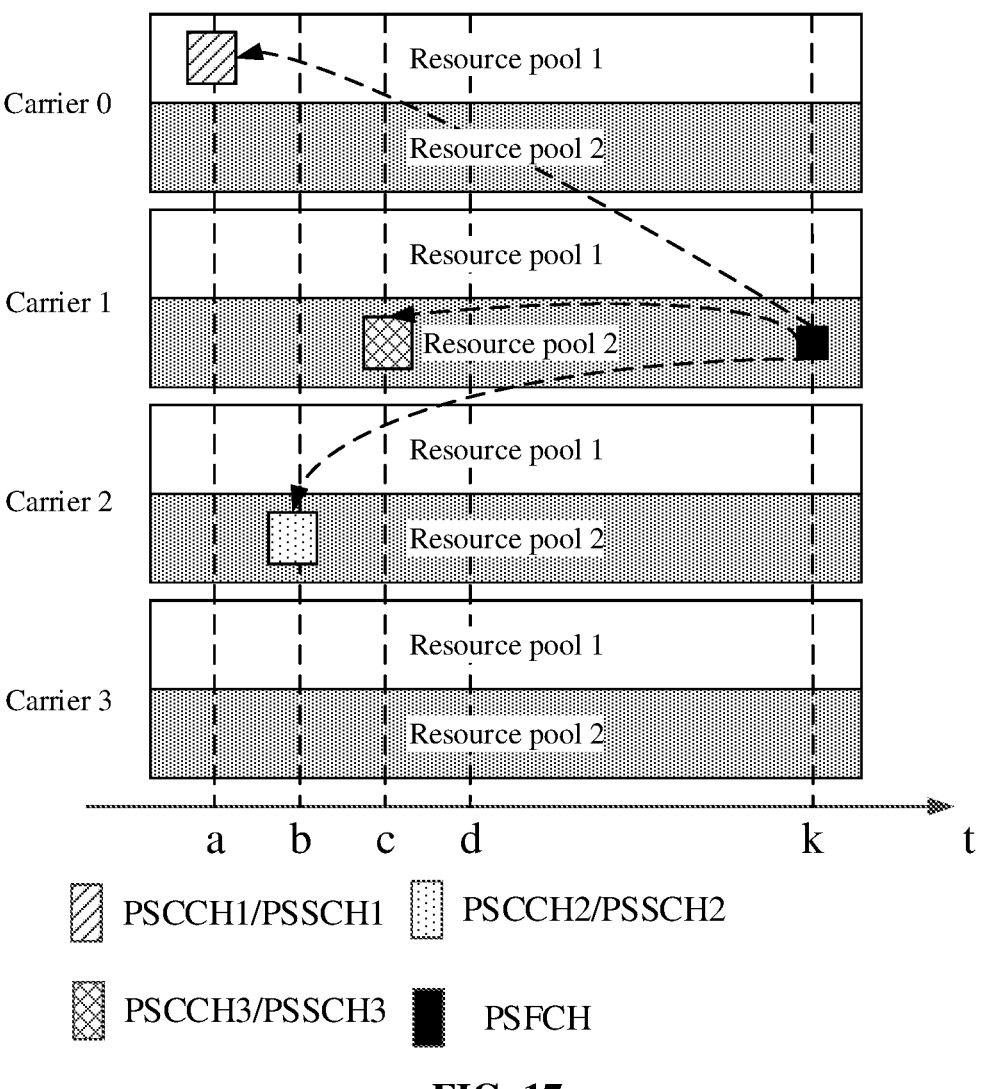
FIG. 17 is a fifth schematic diagram of a PSFCH and multi-carrier transmission of a PSCCH/PSSCH provided by an embodiment of the present application.
FIG. 18 is a fourth flowchart of a resource selection method provided by an embodiment of the present application.

Exemplary, FIG. 17 is a fifth schematic diagram of a PSFCH and multi-carrier transmission of a PSCCH/PSSCH provided by an embodiment of the present application. As shown in FIG. 17, the transmitting terminal transmits a PSCCH1/PSSCH1 in the resource pool 1 on the carrier 0 in time slot a, transmits a PSCCH2/PSSCH2 in the resource pool 2 on the carrier 2 in time slot b, and transmits a PSCCH3/PSSCH3 in the resource pool 2 on the carrier 1 in time slot c. The receiving terminal measures a CBR1 of the resource pool 1 on the carrier 0, a CBR2 of the resource pool 2 on the carrier 2 and a CBR3 of the resource pool 2 on the carrier 1 respectively. If CBR3<CBR1<CBR2, and the receiving terminal determines to transmit PSFCHs for the above three sidelink data on one carrier, then the receiving terminal may determine to transmit the PSFCH by utilizing the resource pool 2 on the carrier 1. In some embodiments, when the receiving terminal determines to transmit the PSFCHs for the above three sidelink data on two carriers, since CBR3<CBR1<CBR2, it may determine to transmit the PSFCHs on the resource pools of the carrier 1 and the carrier 0. That is, the receiving terminal may transmit the PSFCHs utilizing the resource pool 2 on the carrier 1 and the resource pool 1 on the carrier 0.

In an embodiment of the present application, the first terminal may determine at least one resource pool with a CBR less than a CBR threshold from a resource pool set of the multiple carriers according to the CBRs of the resource pools, and select a resource pool for transmitting the PSFCH from the at least one resource pool. Specifically, the first terminal may select a resource pool for transmitting the PSFCH from the at least one resource pool according to an order of CBRs from low to high. In this embodiment, the first terminal selects a resource pool for transmitting the PSFCH from a resource pool set of the multiple carriers according to the CBRs of the resource pools and the CBR threshold.

In this embodiment, the CBR threshold is pre-configured or configured by a network. Only when the CBR of a resource pool is less than the CBR threshold, the resource pool may be used as a candidate resource pool for transmitting the PSFCH. Then, the first terminal selects a resource pool for transmitting the PSFCH from candidate resource pools in an order of CBRs from low to high.

Exemplary, the network configures a CBR_thd (i.e., CBR threshold) via RRC signaling. As shown in FIG. 17, the receiving terminal measures that a CBR1 of the resource pool 1 of the carrier 0 is CBR1<CBR_thd, measures that a CBR2 of the resource pool 2 of the carrier 2 is CBR2>CBR_thd, and measures that a CBR3 of the resource pool 2 of the carrier 1 is CBR3<CBR_thd. Therefore, the receiving terminal takes the resource pool 1 of the carrier 0 and the resource pool 2 of the carrier 1 as candidate resource pools for transmitting the PSFCH. Since CBR3<CBR1, the receiving terminal finally determines the resource pool 2 of the carrier 1 as the resource pool for transmitting the PSFCH.

Optionally, in some embodiments, the determination of the resource pool for transmitting the PSFCH may not be limited to selecting it only from the resource pools in which the PSCCH/PSSCH is received, and all resource pools in all carriers may be used as resource pools for transmitting the PSFCH. Exemplary, as shown in FIG. 17, the receiving terminal may measure the CBRs of all resource pools in all 4 carriers, and then select, according to all the CBR measurement results, the resource pool for transmitting the PSFCH in the order from low to high.

In the resource selection method provided by the present embodiment, the first terminal receives the sidelink data transmitted from the second terminal on the multiple carriers, determines the resource pool for transmitting the PSFCH from the resource pool in which the sidelink data is located according to the measurement information of the resource pool in which the sidelink data is located; or determines the resource pool for transmitting the PSFCH from all the resource pools according to the measurement information of all the resource pools. Herein, all the resource pools include all resource pools available for sidelink transmission, or all resource pools available for the first terminal to perform sidelink transmission, or all resource pools available for the second terminal to perform sidelink transmission. The sidelink feedback information in the sidelink multi-carrier transmission may be selected reasonably by the above solutions, which improves the transmission performance of the sidelink communication, and reduces the transmission conflict and interference of the sidelink communication.

FIG. 17 is a fourth flowchart of a resource selection method provided by an embodiment of the present application. As shown in FIG. 18, the resource selection method provided by the present embodiment includes the following operations 301-302.

In operation 301, a first terminal receives sidelink data from a second terminal on multiple carriers.

In operation 302, the first terminal determines, according to the first indication information, a resource pool for transmitting a PSFCH from the multiple carriers.

Herein, the first indication information indicates at least one resource pool in which the first terminal transmits the PSFCH.

Optionally, the first indication information may be carried in sidelink control information (SCI), a PC5 radio resource control (RRC) signaling or a medium access control layer control unit (MAC CE).

Exemplary, the first terminal receives the PSCCH/PSSCH transmitted by the second terminal, and the first indication information is carried in an SCI carried by the PSCCH, or the first indication information is carried in a second-order SCI or a MAC CE carried by the PSSCH.

In an embodiment of the present application, the first indication information includes index information. The operation that the first terminal determines, according to the first indication information, the resource pool for transmitting the PSFCH from the multiple carriers includes an operation of selecting a resource pool corresponding to the index information as the resource pool for transmitting the PSFCH. That is, the first terminal selects, according to the index information in the first indication information, the resource pool corresponding to the index information as the resource pool for transmitting the PSFCH.

In an embodiment of the present application, when the transmitting terminal and the receiving terminal establish a sidelink, configuration information, such as respective resource pool configuration information, is interacted through the PC5 RRC. The resource pool configuration information includes index information corresponding to the resource pool. For example, the resource pool configuration information of the receiving terminal includes index information corresponding to the transmitting resource pool and/or the receiving resource pool for the receiving terminal, and the resource pool configuration information of the transmitting terminal includes index information corresponding to the transmitting resource pool and/or the receiving resource pool for the transmitting terminal. Therefore, when two terminals perform sidelink communication, the transmitting terminal may indicates, through the first indication information, the resource pool in which the receiving terminal transmits the PSFCH.

Optionally, in some embodiments, the index information in the first indication information includes: a resource pool index and/or a carrier index, and the resource pool index includes an index of a transmitting resource pool and/or an index of a receiving resource pool.

In an embodiment of the present application, the index information includes a resource pool index, and the operation that, the first terminal determines, according to the first indication information, the resource pool for transmitting the PSFCH from the multiple carriers includes an operation of selecting a resource pool corresponding to the resource pool index in the first indication information as the resource pool for transmitting the PSFCH.

In an embodiment of the present application, the index information includes a carrier index, and the operation that the first terminal determines, according to the first indication information, the resource pool for transmitting the PSFCH from the multiple carriers includes an operation of selecting a resource pool for transmitting the PSFCH from resource pools included in a carrier corresponding to the carrier index in the first indication information.

In an embodiment of the present application, the index information includes the resource pool index (a first index) and the carrier index (a second index), and the operation that the first terminal determines, according to the first indication information, the resource pool for transmitting the PSFCH from the multiple carriers includes an operation of selecting a resource pool, corresponding to the resource pool index (the first index), on a carrier corresponding to the carrier index (the second index) in the first indication information as the resource pool for transmitting the PSFCH.

As can be seen from the description of the above several embodiments, when two terminals perform sidelink communication, the transmitting terminal may indicates, through the first indication information the resource pool and/or the carrier on which the receiving terminal transmits the PSFCH.

Exemplary, as shown in FIG. 13, the transmitting terminal transmits a PSSCH1 in the resource pool 1 on the carrier 0 in time slot a, and carries the first indication information in the second-order SCI of the PSSCH1, instructing the first terminal to transmit the PSFCH in the resource pool 1 of the carrier 0. In addition, the transmitting terminal transmits a PSSCH2 in the resource pool 2 on the carrier 1 in time slot b, and carries the first indication information in the second-order SCI of the PSSCH2, instructing the first terminal to transmit the PSFCH in the resource pool 1 of the carrier 0.

Then the receiving terminal may determine to transmit the PSFCHs for the above two sidelink data in the resource pool 1 on the carrier 0 according to the first indication information from the second terminal. Specifically, it can be multiplexed in one PSFCH or fed back separately by using independent PSFCH, which is not limited in this embodiment.

It should be noted that in the existing NR SL, only the transmitting resource pool (TX RP) is configured with the resource pool index, but the receiving resource pool (RX RP) is not configured with the resource pool index. The receiving terminal detects whether there is a PSCCH/PSSCH in the receiving resource pool, and if it is detected successfully, the receiving terminal may transmit the corresponding PSFCH. That is, the receiving terminal may also transmit the PSFCH in the receiving resource pool. Therefore, the receiving resource pool is also needed to be configured with the resource pool index, so that the transmitting terminal may indicates, through the resource pool index, the resource pool in which the receiving terminal transmits the PSFCH.

In the resource selection method provided by the present embodiment, a first terminal receives sidelink data transmitted from a second terminal on multiple carriers, determines, according to the first indication information of the second terminal, a resource pool for transmitting a PSFCH from all carriers available for sidelink transmission, or all carriers available for the first terminal to perform sidelink transmission, or all carriers available for the second terminal to perform sidelink transmission, or multiple carriers on which the sidelink data received by the first terminal from the second terminal is located. It realizes the transmission resources of the sidelink feedback information in the sidelink multi-carrier transmission may be selected reasonably by the above solutions, which improves the transmission performance of the sidelink communication, and reduces the transmission conflict and interference of the sidelink communication.

Figure 19:
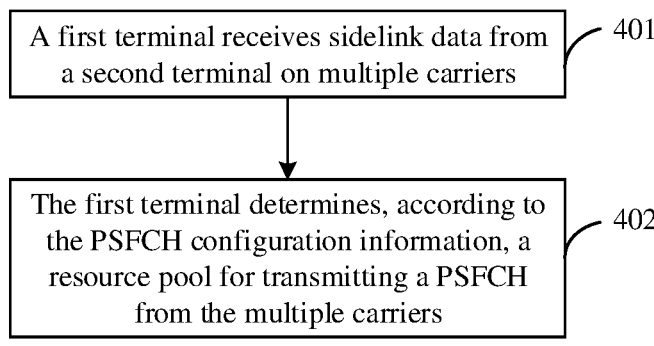
FIG. 19 is a fifth flowchart of a resource selection method provided by an embodiment of the present application.

FIG. 19 is a fifth flowchart of a resource selection method provided by an embodiment of the present application. As shown in FIG. 19, the resource selection method provided by the present embodiment includes the following operations 401-402.

In operation 401, a first terminal receives sidelink data from a second terminal on multiple carriers.

In operation 402, the first terminal determines, according to the PSFCH configuration information, a resource pool for transmitting a PSFCH from the multiple carriers.

In an embodiment of the present application, the PSFCH configuration information includes information for configuring a PSFCH format.

The PSFCH format includes at least one of multiple PSFCH formats.

Herein, any two PSFCH formats of the multiple PSFCH formats are different in at least one of: a number of physical resource blocks (PRBs) occupied by the PSFCH, a number of time domain symbols occupied by the PSFCH, or a maximum number of bits carried by the PSFCH.

It should be noted that the number of PRBs occupied by the PSFCH may refer to the number of PRBs which can be occupied by one PSFCH channel, for example, one PSFCH occupies 1 PRB or 4 PRBs.

In a possible configuration, the system defines at least two PSFCH formats. Exemplary, a PSFCH format 0 carries 1 bit of sidelink feedback information, and a PSFCH format 1 carries N bits of sidelink feedback information, where N is a positive integer greater than 1.

Optionally, in some embodiments, indication information of the PSFCH format supported by the resource pool is included in the resource pool configuration information, and the receiving terminal may determine the resource pool for transmitting the PSFCH according to the PSFCH format supported by the resource pool. Specifically, when the receiving terminal determines that more than 1 bit of sidelink feedback information needs to be transmitted in one time slot, the receiving terminal selects a resource pool supporting the PSFCH format 1 as the resource pool for transmitting the PSFCH. When the receiving terminal determines to transmit 1 bit of sidelink feedback information in one time slot, the receiving terminal selects a resource pool supporting the PSFCH format 0 as the resource pool for transmitting the PSFCH.

Exemplary, as shown in FIG. 17, the transmitting terminal transmits 3 PSCCHs/PSSCHs, and the receiving terminal needs to transmit sidelink feedback information for the 3 PSCCHs/PSSCHs in time slot k, which is carried on one PSFCH. If the resource pool 1 and the resource pool 2 on the carrier 0 support the PSFCH format 0, and the resource pool 2 on the carrier 1 supports the PSFCH format 1, then the receiving terminal selects the resource pool 2 on the carrier 1 as the resource pool for transmitting the PSFCH.

In a possible configuration, the system defines at least two PSFCH formats. Exemplary, the number of PRBs occupied by the PSFCH format 0 is less than or equal to a first threshold (e.g. the first threshold is 1), and the number of PRBs occupied by the PSFCH format 1 is greater than the first threshold. Further, the threshold of the number of multiple PRBs may also be set according to actual requirements, which is not limited in the embodiment of the present application.

In a possible configuration, the system defines at least two PSFCH formats. Exemplary, the number of time domain symbols occupied by the PSFCH format 0 is less than or equal to a second threshold (e.g. the second threshold is 2), and the number of time domain symbols occupied by the PSFCH format 1 is greater than the second threshold. Further, the threshold of the number of multiple time domain symbols may also be set according to actual requirements, which is not limited in the embodiment of the present application.

In an embodiment of the present application, if the first terminal determines that the format for transmitting the PSFCH is the first PSFCH format, then the operation that, the first terminal determines, according to the PSFCH configuration information, the resource pool for transmitting the PSFCH from the multiple carriers includes an operation that the first terminal determines PSFCH formats supported by the resource pools of the multiple carriers according to the PSFCH configuration information, and determines a resource pool for transmitting the PSFCH from the resource pools supporting the first PSFCH format.

Herein, the first PSFCH format may be any one of the PSFCH formats in any of the above configurations.

Optionally, the resource pools of the multiple carriers may refer to the resource pools of the multiple carriers on which the first terminal receives sidelink data (i.e., the resource pools of the multiple carriers on which the first terminal receives the PSCCH/PSSCH), or may refer to the resource pools of all carriers available for sidelink transmission, or may also refer to the resource pools of all carriers available for the first terminal or the second terminal to perform sidelink transmission, which is not limited in the embodiments of the present application.

Exemplary, as shown in FIG. 17, if the resource pool 1 and the resource pool 2 on the carrier 0 also support the PSFCH format 1, then the receiving terminal may select one of the resource pool 1 and the resource pool 2 on the carrier 0, and the resource pool 2 on the carrier 1 as the resource pool for transmitting the PSFCH.

In the resource selection method provided by the above embodiment, a first terminal receives sidelink data transmitted from a second terminal on multiple carriers and determines, according to the PSFCH format supported by the resource pool in the resource pool configuration information, a resource pool for transmitting a PSFCH from all carriers available for sidelink transmission, or all carriers available for the first terminal to perform sidelink transmission, or all carriers available for the second terminal to perform sidelink transmission, or multiple carriers on which the sidelink data received by the first terminal from the second terminal is located. The transmission resources of the sidelink feedback information in the sidelink multi-carrier transmission may be selected reasonably by the above solutions, which improves the transmission performance of the sidelink communication, and reduces the transmission conflict and interference of the sidelink communication.

In an embodiment of the present application, the PSFCH configuration information includes information for configuring a PSFCH transmission resource.

The PSFCH configuration information includes at least one of a first parameter and a second parameter.

The first parameter is used to indicate a PRB available for transmitting the PSFCH in a PSFCH time slot, and the second parameter is used to indicate a Cyclic Shift Pair.

Exemplary, the first parameter is the parameter sl-PSFCH-RB-Set indicating the number of PRBs available for transmitting the PSFCH in the frequency domain. It should be noted that the first parameter represents the set of PRBs available for PSFCH transmission in the resource pool, for example, the system bandwidth includes 100 PRBs, and the first parameter indicates 50 PRBs to be available for transmitting the PSFCH. Each PSFCH occupies 1 PRB or 4 PRBs according to different PSFCH formats.

Exemplary, the second parameter is the parameter sl-NumMuxCS-Pair indicating a Cyclic Shift Pair. The second parameter specifically indicates the number of PSFCHs multiplexed by code division multiplexing (CDM) in the PRBs occupied by the PSFCHs. The above two parameters may be used to determine the number of resources to transmit the PSFCH.

In an embodiment of the present application, the operation that the first terminal determines, according to the PSFCH configuration information, the resource pool for transmitting the PSFCH from the multiple carriers includes an operation that the first terminal selects the resource pool for transmitting the PSFCH according to the number of the PSFCH transmitting resources included in the resource pools of the multiple carriers. It should be understood that the larger the number of PSFCH resources, the lower the interference between the PSFCHs, and the better the transmission performance of the PSFCH.

Optionally, the resource poos of the multiple carriers may refer to resource pools of multiple carriers on which the first terminal receives sidelink data (i.e., the resource pools of the multiple carriers on which the first terminal receives the PSCCH/PSSCH), may also refer to the resource pools of all carriers available for sidelink transmission, and may also refer to the resource pools of all carriers available for the first terminal or the second terminal to perform sidelink transmission, which is not limited in the embodiments of the present application.

In a possible implementation, the first terminal uses a resource pool with a largest first parameter among all the resource pools of the multiple carriers as the resource pool for transmitting the PSFCH. That is to say, the resource pool for which the parameter sl-PSFCH-RB-Set includes the largest number of PRBs is selected as the resource pool for transmitting the PSFCH.

In a possible implementation, the first terminal uses a resource pool with a largest second parameter among all the resource pools of the multiple carriers as the resource pool for transmitting the PSFCH. That is to say, the resource pool for which the parameter sl-NumMuxCS-Pair includes the largest number of cyclic shift pairs is selected as the resource pool for transmitting the PSFCH.

In a possible implementation, the first terminal uses a resource pool with a largest product of the first parameter and the second parameter among all the resource pools of the multiple carriers as the resource pool for transmitting the PSFCH. That is to say, the resource pool for which the parameter sl-NumMuxCS-Pair includes the largest number of cyclic shift pairs and the parameter sl-PSFCH-RB-Set includes the largest number of PRBs is selected as the resource pool for transmitting the PSFCH.

In the resource selection method provided by the above embodiment, the first terminal receives the sidelink data transmitted from the second terminal on the multiple carriers and determines, according to the PSFCH transmitting resource number of the resource pool in the resource pool configuration information, the resource pool for transmitting the PSFCH from all carriers available for sidelink transmission, or all carriers available for the first terminal to perform sidelink transmission, or all carriers available for the second terminal to perform sidelink transmission, or multiple carriers on which the sidelink data received from the second terminal by the first terminal is located. The transmission resources of the sidelink feedback information in the sidelink multi-carrier transmission may be selected reasonably by the above solutions, which improves the transmission performance of the sidelink communication, and reduces the transmission conflict and interference of the sidelink communication.

In an embodiment of the present application, the operation that the first terminal determines, according to the PSFCH configuration information, the resource pool for transmitting the PSFCH from the multiple carriers includes an operation that the first terminal determines a resource pool set configured with a PSFCH transmitting resource in the multiple carriers according to the PSFCH configuration information, and determines the resource pool for transmitting the PSFCH from the resource pool set configured with the PSFCH transmitting resource.

Optionally, the above multiple carriers may refer to multiple carriers on which the first terminal receives sidelink data (i.e., the multiple carriers on which the first terminal receives the PSCCH/PSSCH), may also refer to all carriers available for sidelink transmission, and may also refer to the all carriers available for the first terminal or the second terminal to perform sidelink transmission, and the embodiments of the present application do not make any limitation to this.

In the present embodiment, the PSFCH configuration information includes resources available for transmitting the PSFCH, such as a carrier set and/or a resource pool set available for transmitting the PSFCH.

Optionally, the PSFCH configuration information in any of the above embodiments may be pre-configuration information or information configured by a network. When the PSFCH configuration information is configured by a network, the configuration information may be carried in System Information Blocks (SIB), Radio Resource Control (RRC) signaling, or Downlink Control Information (DCI) signaling.

Optionally, in some embodiments, the above pre-configuration information or information configured by a network includes a carrier set supported by sidelink transmission, and in addition to configuring one or more carriers of the carrier set to be available for transmitting the PSFCH, the one or more carriers of the carrier set may also be configured to be available for transmitting the PSCCH or the PSSCH. When receiving the PSCCH/PSSCH on the sidelink carrier, the receiving terminal can only select the resource pool for transmitting the PSFCH from the configured one or more carriers available for transmitting the PSFCH.

Exemplary, the network configures 4 carriers supporting sidelink transmission e.g. carriers 0-3, through RRC signaling, and configures carrier 0 and carrier 1 as carriers for transmitting the PSFCH. When receiving the PSCCH/PSSCH on the carriers 0-3, the receiving terminal can only select one or two carriers for transmitting the PSFCH from the carrier 0 and the carrier 1.

Exemplary, the network configures 4 carriers supporting sidelink transmission, e.g. carriers 0-3, through RRC signaling, and configures resource pools on each carrier through RRC signaling, and only configures PSFCH transmitting resources in the resource pools on the carrier 0 and the carrier 3. Then when receiving the PSCCH/PSSCH on each carrier, the receiving terminal can only transmit the PSFCH using the resource pools on the carrier 0 and the carrier 3.

In the resource selection method provided by the above embodiment, the first terminal receives the sidelink data transmitted from the second terminal on the multiple carriers determines, according to the carrier set available for transmitting the PSFCH in the PSFCH configuration information, the resource pool for transmitting the PSFCH from all carriers available for sidelink transmission, or all carriers available for the first terminal to perform sidelink transmission, or all carriers available for the second terminal to perform sidelink transmission, or multiple carriers on which the sidelink data received by the first terminal from the second terminal is located. The transmission resources of the sidelink feedback information in the sidelink multi-carrier transmission may be selected reasonably by the above solutions, which improves the transmission performance of the sidelink communication, and reduces the transmission conflict and interference of the sidelink communication.

It should be understood that the method of the embodiments of the present application may also be applied to determining a Bandwidth Part (BWP) for transmitting a PSFCH.

How the receiving terminal determines the BWP of the PSFCH is described in detail below.

In an embodiment of the present application, a first terminal receives sidelink data from a second terminal on multiple carriers, and the first terminal determines a BWP for transmitting the PSFCH from the multiple carriers.

Optionally, at least one BWP is configured on each of the multiple carriers.

Optionally, the first terminal determines the BWP for transmitting the PSFCH from the multiple carriers according to at least one of a BWP in which the sidelink data is located, PSFCH configuration information, measurement information of a resource pool in the BWP and second indication information. Herein, the second indication information indicates at least one BWP for transmitting the PSFCH.

Optionally, the BWP on which the first sidelink data received by the first terminal from the second terminal on the multiple carriers is located and the BWP on which the PSFCH corresponding to of the first sidelink data is transmitted are different BWPs. Herein, the first sidelink data is sidelink data received by the first terminal from the second terminal on one of the multiple carriers.

Optionally, the carrier on which the first sidelink data is located and the carrier on which the PSFCH corresponding to the first sidelink data is transmitted are different carriers.

Optionally, the BWP in which the first sidelink data received by the first terminal from the second terminal on the multiple carriers is located and the BWP on which the PSFCH corresponding to the first sidelink data is transmitted are the same BWP.

Optionally, the carrier on which the first sidelink data is located and the carrier on which the PSFCH corresponding to the first sidelink data is transmitted are the same carriers.

Optionally, the BWP on which the first sidelink data received by the first terminal from the second terminal on the multiple carriers and the BWP on which the PSFCH corresponding to the first sidelink data is transmitted are the same BWP, and the carrier on which the first sidelink data is located and the carrier on which the PSFCH corresponding to the first sidelink data is transmitted are the same carrier.

In an embodiment of the present application, the first terminal receives the sidelink data from the second terminal on the multiple carriers; and the first terminal determines the BWP for transmitting the PSFCH from the multiple carriers according to the BWP on which the sidelink data is located.

In an embodiment of the present application, the operation that the first terminal determines, according to the BWP on which the sidelink data is located, the BWP for transmitting the PSFCH from the multiple carriers includes an operation that the first terminal obtains at least one BWP on which a PSCCH or PSSCH received on the multiple carriers from the second terminal is located, and determines the BWP for transmitting the PSFCH from the at least one BWP.

Optionally, when the first terminal receives the sidelink data from the second terminal in the multiple carriers, a first carrier for transmitting the PSFCH may be determined from the multiple carriers first, then at least one BWP on which the sidelink data is located is acquired, and a BWP, corresponding to the at least one BWP on which the sidelink data is located, on the first carrier is selected as the BWP for transmitting the PSFCH.

In one embodiment of the present application, when the first terminal determines that the BWP for transmitting the PSFCH is one BWP, the BWP for transmitting the PSFCH may be determined from at least one BWP in the following two implementation.

In an optional implementation, the first terminal determines the BWP for transmitting the PSFCH from the at least one BWP according to priority information. Specifically, the first terminal may determine the BWP for transmitting the PSFCH from the at least one BWP according to the priority information of the sidelink data. The sidelink control information (SCI) carries the priority information of the sidelink data. The first terminal may select a BWP on which the sidelink data with the highest priority (or the lowest priority) is located from at least one BWP, or the first terminal may select a BWP on which the PSSCH with the highest priority (or the lowest priority) is located from at least one BWP, and use the BWP as the BWP for transmitting the PSFCH.

In an optional implementation, the first terminal determines the BWP for transmitting the PSFCH from the at least one BWP according to a chronological order of received the PSCCH or PSSCH. Specifically, the first terminal may determine the BWP for transmitting the PSFCH from the at least one BWP according to the receiving time of the sidelink data. The first terminal may use the BWP on which the first received sidelink data is located as the BWP for transmitting the PSFCH, or use the BWP in which the last received sidelink data is located as the BWP for transmitting the PSFCH.

In an embodiment of the present application, the first terminal receives the sidelink data from the second terminal on the multiple carriers; and the first terminal determines the BWP for transmitting the PSFCH from the multiple carriers according to the measurement information of the resource pools in the BWP.

In an embodiment of the present application, the first terminal may determine the BWP for transmitting the PSFCH according to the measurement result of the resource pool in the BWP on which the received PSCCH/PSSCH is located.

Optionally, the measurement information of the resource pools in the BWP includes channel busy ratios (CBRs) of the resource pools in the BWP.

In an embodiment of the present application, the first terminal may select, according to the CBR of the resource pool in the BWP, the BWP for transmitting the PSFCH from a BWP set of the multiple carriers in an order of CBRs of resource pools in BWPs from low to high.

In an embodiment of the present application, the first terminal may determine at least one BWP with a CBR of the resource pool in the BWP less than a CBR threshold from a BWP set of the multiple carriers according to the CBR of the resource pool in the BWP, and select the BWP for transmitting the PSFCH from the at least one BWP. Specifically, the first terminal may select the BWP for transmitting the PSFCH from the at least one BWP according to a chronological order of CBRs of the resource pools in the BWP from low to high.

Optionally, in some embodiments, the determination of the BWP for transmitting the PSFCH may not be limited to selecting only from the BWP on which the PSCCH/PSSCH is received, and all BWPs in all carriers may be used as BWPs for transmitting the PSFCH.

In an embodiment of the present application, the first terminal receives the sidelink data from the second terminal on the multiple carriers; and the first terminal determines the BWP for transmitting the PSFCH from the multiple carriers according to the second indication information.

Herein, the second indication information indicates at least one BWP on which the first terminal transmits the PSFCH.

Optionally, the second indication information may be carried in a sidelink control information (SCI), a PC5 radio resource control RRC signaling or a medium access control layer control unit (MAC CE).

In an embodiment of the present application, the second indication information includes index information. The operation that, the first terminal determines, according to the second indication information, the BWP for transmitting the PSFCH from the multiple carriers includes an operation of selecting a BWP corresponding to the index information as the BWP for transmitting the PSFCH. That is, the first terminal selects the BWP corresponding to the index information as the BWP for transmitting the PSFCH according to the index information in the second indication information.

In an embodiment of the present application, when the transmitting terminal and the receiving terminal establish a sidelink, configuration information, such as respective BWP configuration information, is interacted through the PC5 RRC. The BWP configuration information includes index information corresponding to the BWP. Therefore, when two terminals perform sidelink communication, the transmitting terminal may indicate the BWP on which the receiving terminal transmits the PSFCH through the second indication information.

Optionally, in some embodiments, the index information in the second indication information includes: a BWP index and/or a carrier index.

In an embodiment of the present application, the index information includes the BWP index, and the operation that the first terminal determines, according to the second indication information, the BWP for transmitting the PSFCH from the multiple carriers includes an operation of selecting a BWP corresponding to the BWP index in the second indication information as the BWP for transmitting the PSFCH.

In an embodiment of the present application, the index information includes the carrier index, and the operation that the first terminal determines, according to the second indication information, the BWP for transmitting the PSFCH from the multiple carriers includes an operation of selecting the BWP for transmitting the PSFCH from BWPs included in a carrier corresponding to the carrier index in the first indication information.

In an embodiment of the present application, the index information includes the BWP index (a first index) and the carrier index (a second index), and the operation that the first terminal determines, according to the second indication information, the BWP for transmitting the PSFCH from the multiple carriers includes an operation of selecting a BWP corresponding to the BWP index (the first index) on a carrier corresponding to the carrier index (the second index) in the second indication information as the BWP for transmitting the PSFCH.

As can be seen from the description of the above several embodiments, when two terminals perform sidelink communication, the transmitting terminal indicates the BWP and/or the carrier on which the receiving terminal transmits the PSFCH through the second indication information.

In an embodiment of the present application, the first terminal receives the sidelink data from the second terminal on the multiple carriers; and the first terminal determines the BWP for transmitting the PSFCH from the multiple carriers according to the PSFCH configuration information.

Optionally, the PSFCH configuration information includes information for configuring a PSFCH format. The PSFCH format includes at least one of multiple PSFCH formats. Herein, any two PSFCH formats among multiple PSFCH formats are different in at least one of: a number of physical resource blocks (PRBs) occupied by the PSFCH, a number of time domain symbols occupied by the PSFCH, or a maximum number of bits carried by the PSFCH. The configuration of PSFCH format can be referred to the above embodiments and will not be repeated here.

In an embodiment of the present application, if the first terminal determines that the format for transmitting the PSFCH is a first PSFCH format, then the operation that by the first terminal determines, according to the PSFCH configuration information, the BWP for transmitting the PSFCH from the multiple carriers includes the operation that the first terminal determines PSFCH formats supported by BWPs in the multiple carriers according to the PSFCH configuration information, and determines the BWP for transmitting the PSFCH from BWPs supporting the first PSFCH format.

Herein, the first PSFCH format may be any one of the PSFCH formats in the PSFCH format configurations.

Optionally, the BWPs in the multiple carriers may refer to BWPs of multiple carriers on which the first terminal receives sidelink data (i.e., BWPs of multiple carriers on which the first terminal receives the PSCCH/PSSCH), may also refer to BWPs of all carriers available for sidelink transmission, or may refer to BWPs of all carriers available for the first terminal or the second terminal to perform sidelink transmission, which is not limited in the embodiments of the present application.

Optionally, the PSFCH configuration information includes information for configuring a PSFCH transmission resource. Exemplary, the PSFCH configuration information includes at least one of the first parameter for indicating a PRB available for transmitting the PSFCH in a PSFCH time slot and the second parameter for indicating a Cyclic Shift Pair.

In an embodiment of the present application, the operation that the first terminal determines, according to the PSFCH configuration information, the BWP for transmitting the PSFCH from the multiple carriers includes an operation that the first terminal selects the BWP for transmitting the PSFCH according to the number of PSFCH transmitting resources included in the BWPs of the multiple carriers.

Optionally, the BWPs of the multiple carriers may refer to BWPs of multiple carriers on which the first terminal receives sidelink data (i.e., BWPs of multiple carriers on which the first terminal receives the PSCCH/PSSCH), may refer to the BWPs of all carriers available for sidelink transmission, or may also refer to BWPs of all carriers available for the first terminal or the second terminal to perform sidelink transmission, which is not limited in the embodiments of the present application.

In a possible implementation, the first terminal uses a BWP with a largest first parameter among all BWPs of the multiple carriers as the BWP for transmitting the PSFCH.

In a possible implementation, the first terminal uses a BWP with a largest second parameter among all BWPs of the multiple carriers as the BWP for transmitting the PSFCH.

In a possible implementation, the first terminal takes a BWP with a largest product of the first parameter and the second parameter among all BWPs of the multiple carriers as the BWP for transmitting the PSFCH.

In an embodiment of the present application, the first terminal determines, according to the PSFCH configuration information, the BWP for transmitting the PSFCH from the multiple carriers includes an operation that the first terminal determines the BWP set configured with the PSFCH transmitting resource in the multiple carriers according to the PSFCH configuration information, and determines the BWP for transmitting the PSFCH from the BWP set configured with the PSFCH transmitting resource.

Optionally, the multiple carriers may refer to multiple carriers on which the first terminal receives sidelink data (i.e., multiple carriers on which the first terminal receives the PSCCH/PSSCH), may refer to all carriers available for sidelink transmission, or may also refer to all carriers available for the first terminal or the second terminal to perform sidelink transmission, which is not limited in the embodiments of the present application.

Optionally, the PSFCH configuration information includes resources available for transmitting the PSFCH, such as a carrier set and/or a BWP set available for transmitting the PSFCH.

Optionally, the PSFCH configuration information in any of the above embodiments may be pre-configuration information or information configured by a network. When the PSFCH configuration information is configured by a network, the configuration information may be carried in System Information Blocks (SIB), Radio Resource Control (RRC) signaling, or Downlink Control Information (DCI) signaling.

Optionally, in some embodiments, the above pre-configuration information or information configured by a network includes a carrier set supporting sidelink transmission, and in addition to configuring one or more carriers of the carrier set to be available for transmitting the PSFCH, the one or more carriers of the carrier set may also be configured to be available for transmitting the PSCCH or the PSSCH. When receiving the PSCCH/PSSCH on the sidelink carrier, the receiving terminal can only select the BWP for transmitting the PSFCH from the configured one or more carriers available for transmitting the PSFCH.

Figure 20:
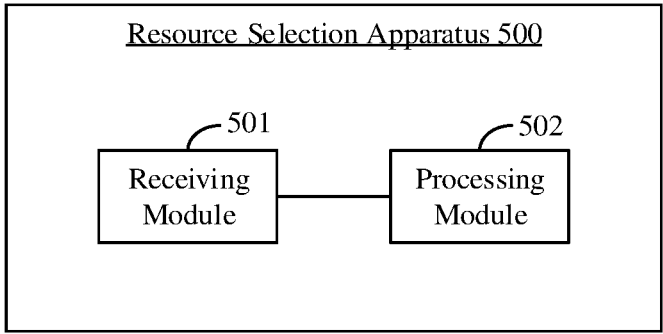
FIG. 20 is a structure diagram of a resource selection apparatus provided by an embodiment of the present application.

Exemplary, FIG. 20 is a structure diagram of a resource selection apparatus provided by an embodiment of the present application. As shown in FIG. 20, the resource selection apparatus 500 provided by the present embodiment includes: a receiving module 501 and a processing module 502.

The receiving module 501 is configured to receive sidelink data from a second terminal on multiple carriers.

The processing module 502 is configured to determine a resource pool for transmitting a physical sidelink feedback channel (PSFCH) from the multiple carriers.

In an embodiment of the present application, the multiple carriers include:

all carriers available for sidelink transmission, or, carriers available for a first terminal to perform sidelink transmission, or, carriers available for the second terminal to perform sidelink transmission, or, carriers on which the first terminal receives the sidelink data from the second terminal.

In an embodiment of the present application, the processing module 502 is specifically configured to: determine the resource pool for transmitting the PSFCH from the multiple carriers according to at least one of: a resource pool in which the sidelink data is located, PSFCH configuration information, measurement information of resource pools and first indication information;

Herein, the first indication information indicates at least one resource pool for transmitting the PSFCH.

In an embodiment of the present application, the processing module 502 is specifically configured to: obtain at least one resource pool in which a PSCCH or PSSCH received on the multiple carriers from the second terminal is located, and determine the resource pool for transmitting the PSFCH from the at least one resource pool.

In an embodiment of the present application, the processing module 502 is specifically configured to:

determine, according to priority information, the resource pool for transmitting the PSFCH from the at least one resource pool; or, determine, according to a chronological order of the received PSCCH or PSSCH, the resource pool for transmitting the PSFCH from the at least one resource pool.

In an embodiment of the present application, the measurement information of the resource pools includes channel busy ratios (CBRs) of the resource pools, and the processing module 502 is specifically configured to:

select, according to the CBRs of the resource pools, a resource pool for transmitting the PSFCH from a resource pool set of the multiple carriers in an order of CBRs from low to high.

In an embodiment of the present application, the measurement information of the resource pools includes CBRs of the resource pools; and the processing module 502 is specifically configured to:

determine, according to the CBRs of the resource pools, at least one resource pool with a CBR less than a CBR threshold from a resource pool set of the multiple carriers, and select a resource pool for transmitting the PSFCH from the at least one resource pool.

In an embodiment of the present application, the processing module 502 is specifically configured to:

select, according to an order of CBRs from low to high, a resource pool for transmitting the PSFCH from the at least one resource pool.

In an embodiment of the present application, the first indication information includes index information, and the processing module 502 is specifically configured to: select a resource pool corresponding to the index information as the resource pool for transmitting the PSFCH.

In an embodiment of the present application, the index information includes a resource pool index and/or a carrier index, and the resource pool index includes an index of a transmitting resource pool and/or an index of a receiving resource pool.

In an embodiment of the present application, the first indication information is carried in sidelink control information (SCI), a PC5 radio resource control (RRC) signaling or a medium access control layer control unit (MAC CE).

In an embodiment of the present application, the PSFCH configuration information includes information for configuring a PSFCH format.

In an embodiment of the present application, the PSFCH format includes at least one of multiple PSFCH formats, and any two PSFCH formats of the multiple PSFCH formats are different in at least one of:

a number of physical resource blocks (PRBs) occupied by the PSFCH, a number of time domain symbols occupied by the PSFCH, or a maximum number of bits carried by the PSFCH.

In an embodiment of the present application, if the processing module 502 determines that a format for transmitting the PSFCH is a first PSFCH format, the processing module 502 is specifically configured to:

determine, according to the PSFCH configuration information, PSFCH formats supported by resource pools in the multiple carriers, and determine the resource pool for transmitting the PSFCH from resource pools supporting the first PSFCH format.

In an embodiment of the present application, the PSFCH configuration information includes information for configuring PSFCH transmission resources; and the processing module 502 is specifically configured to:

select, according to a number of PSFCH transmission resources included in the resource pools of the multiple carriers, a resource pool for transmitting the PSFCH.

In an embodiment of the present application, the PSFCH configuration information includes at least one of a first parameter or a second parameter, and the first parameter indicates a PRB available for transmitting the PSFCH in a PSFCH time slot, and the second parameter indicates a Cyclic Shift Pair.

In an embodiment of the present application, the processing module 502 is specifically configured to:

use a resource pool with a largest first parameter among all the resource pools of the multiple carriers as the resource pool for transmitting the PSFCH; or use a resource pool with a largest second parameter among all the resource pools of the multiple carriers as the resource pool for transmitting the PSFCH; or use a resource pool with a largest product of the first parameter and the second parameter among all the resource pools of the multiple carriers as the resource pool for transmitting the PSFCH.

In an embodiment of the present application, the processing module 502 is specifically configured to:

determine, according to the PSFCH configuration information, a resource pool set configured with PSFCH transmission resources in the multiple carriers, and determine the resource pool for transmitting the PSFCH from the resource pool set configured with PSFCH transmission resources.

In an embodiment of the present application, the sidelink data received from the second terminal on multiple carriers includes: the sidelink data at the same moment from the second terminal, and/or the sidelink data at different moments.

In an embodiment of the present application, the sidelink data received from the second terminal on the multiple carriers belongs to a same transmission block (TB) or different transmission blocks.

In an embodiment of the present application, the sidelink feedback information corresponding to the sidelink data received from the second terminal on the multiple carriers is carried on one PSFCH, or carried on different PSFCHs.

In an embodiment of the present application, the resource pool in which the first sidelink data received from the second terminal on the multiple carriers is located and the resource pool in which the PSFCH corresponding to the first sidelink data is transmitted are different resource pools, and/or, the carrier on which the first sidelink data is located and the carrier on which the PSFCH corresponding to the first sidelink data is transmitted are different carriers.

Herein, the first sidelink data is sidelink data received from the second terminal on one of the multiple carriers.

The resource selection apparatus provided by the embodiments of the present application is used for executing the technical solution executed by the first terminal in the aforementioned method embodiments, and its realization principle and technical effect are similar, which will not be repeated here.

It should be noted that the division of each module of the above resource selection apparatus is only a logical function division, which can be completely or partially integrated into a physical entity or physically separated in actual implementation. And these modules may all be implemented in the form of software calling through processing elements; may also be implemented in the form of hardware. Some modules may also be implemented in the form of software called by processing elements, and some modules may be implemented in the form of hardware. For example, the processing module may be a separate processing element, or may be integrated in a certain chip of the above apparatus, in addition, may also be stored in the memory of the above apparatus in the form of program code, and the function of the above module may be called and executed by a certain processing element of the above apparatus. The implementation of other modules is similar. In addition, all or part of these modules may be integrated or may be implemented independently. The processing element described herein may be an integrated circuit with signal processing capability. In implementation, the respective steps or modules of the above method may be accomplished by integrated logic circuits of hardware in the processor element or by instructions in the form of software.

For example, the above modules may be one or more integrated circuits configured to implement the above methods, such as: one or more application specific integrated circuits (ASIC), or one or more microprocessors (digital signal processor, DSP), or one or more field programmable gate arrays (FPGA), etc. As another example, when one of the above modules is implemented in the form of a processing element scheduler code, the processing element may be a general purpose processor, such as a central processing unit (CPU) or other processor that can call the program code. For another example, these modules may be integrated and implemented in the form of system-on-a-chip (SOC).

In the above embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described according to the embodiments of the present application are generated in whole or in part. The computer may be a general purpose computer, a special purpose computer, a computer network, or other programmable apparatuses. The computer instructions may be stored in or transmitted from one computer-readable storage medium to another. For example, the computer instructions may be transmitted from one Web site, computer, server, or data center via a wired (e.g. coaxial cable, optical fiber, digital subscriber line (DSL)) or wireless (e.g. infrared, wireless, microwave, etc.) mode to another Web site, computer, server, or data center. The computer-readable storage medium may be any available medium accessible to a computer or a data storage device such as a server, a data center, or the like that contains one or more available media integration. The available media may be magnetic media (e.g. floppy disk, hard disk, magnetic tape), optical media (e.g. DVD), or semiconductor media (e.g. solid state disk (SSD)), etc.

Figure 21:
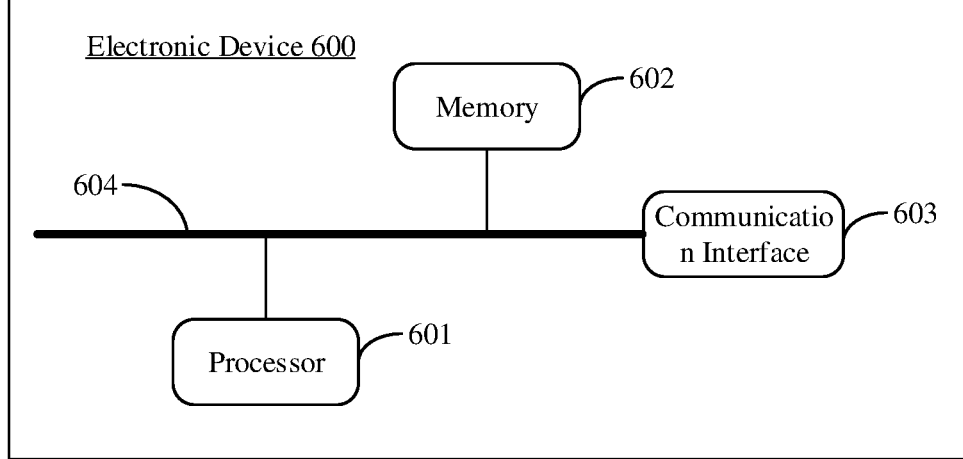
FIG. 21 is a structure diagram of hardware of an electronic device provided by an embodiment of the present application.

FIG. 21 is a structure diagram of hardware of an electronic device provided by an embodiment of the present application. As shown in FIG. 21, the electronic device 600 provided by the present embodiment may include a processor 601, a memory 602 and a communication interface 603.

Herein, the memory 602 is configured to store computer programs; the processor 601 is used to execute the computer program stored in the memory 602 to implement the method performed by the first terminal in any of the above method embodiments. The communication interface 603 is used for data communication or signal communication with other devices.

Optionally, the memory 602 may be either independent or integrated with the processor 601. When the memory 602 is a device independent of the processor 601, the electronic device 600 may further include: a bus 604 used for connecting the memory 602 and the processor 601.

In a possible implementation, the processing module 502 in FIG. 20 may be integrated in the processor 601 to implement, and the receiving module 501 in FIG. 20 may be integrated in the communication interface 603 to implement.

The electronic device provided by the present embodiment may be used to execute the method executed by the first terminal in any of the above method embodiments, and its realization principle and technical effect are similar, which will not be repeated here.

The embodiments of the present application also provide a computer-readable storage medium, and the computer-readable storage medium stores computer-executed instructions. The computer-executed instructions, when executed by the processor, are used to implement the technical solution of the first terminal in any of the aforementioned method embodiments.

The embodiments of the present application also provide a computer program. The computer program, when executed by the processor, is used to execute the technical solution of the first terminal in any of the aforementioned method embodiments.

The embodiments of the present application also provide a computer program product, which includes program instructions. The program instructions are used to implement the technical solution of the first terminal in any of the aforementioned method embodiments.

The embodiments of the present application also provide a chip, which includes a processing module and a communication interface. The processing module can execute the technical solution of the first terminal in the aforementioned method embodiments.

Further, the chip further includes a memory module (e.g., a memory) for storing instructions. The processing module is used to execute the instructions stored in the memory module, and execution of the instructions stored in the memory module causes the processing module to execute the technical solution of the first terminal in any of the aforementioned method embodiments.

The embodiments of the present application provide a resource selection method, an apparatus, a device and a storage medium, which is available for a sidelink communication system to improve the performance of sidelink multi-carrier transmission. The resource selection method includes operations that a first terminal receives sidelink data from a second terminal on multiple carriers; and the first terminal may select a resource pool for transmitting a PSFCH from multiple carriers on which the sidelink data is located or from all of the multiple carriers available for sidelink transmission. Through the above resource selection solution, the selection of the sidelink feedback resources for multi-carrier transmission is realized, and the performance of sidelink multi-carrier transmission is improved.

In the present application, "at least two" means two or more, and "multiple" means two or more than two. "And/or", which describes the association relationship of the associated objects, means that there may be three relationships, for example, A and/or B, may mean that there is a single A, there are both A and B, and there is a single B, where A and B may be singular or plural. The character "/" generally means that the associated objects are a kind of "or" relationship. In the formula, the character "/" means that the associated objects are a "division" relationship. "At least one of the following" or its similar expression refers to any combination of these items, including any combination of single items or plural items. For example, at least one of a, b, or c may mean: a, b, c, a-b, a-c, b-c, or a-b-c, where a, b, c may be single or multiple.

It can be understood that the various numerical numbers related in the embodiments of the present application are for the convenience of description only and are not intended to limit the scope of the embodiments of the present application.

It can be understood that in the embodiments of the present application, the size of the order number of the above processes does not mean the order of execution, and the execution order of each process should be determined according to its function and inherent logic, and should not constitute any limitation on the implementation process of the embodiments of the present application.

What is claimed is:

1. A resource selection method, comprising:

receiving, by a first terminal, sidelink data from a second terminal on multiple carriers; and determining, by the first terminal, a resource pool for transmitting a physical sidelink feedback channel (PSFCH) from the multiple carriers, which comprises:

determining, by the first terminal, the resource pool for transmitting the PSFCH from the multiple carriers according to PSFCH configuration information, wherein the PSFCH configuration information comprises information for configuring a PSFCH format, and the PSFCH format comprises at least one of multiple PSFCH formats, and any two PSFCH formats of the multiple PSFCH formats are different in at least one of: a number of time domain symbols occupied by the PSFCH; or a maximum number of bits carried by the PSFCH.

2. The method of claim 1, wherein determining the resource pool for transmitting the PSFCH from the multiple carriers further comprises:

determining, by the first terminal, the resource pool for transmitting the PSFCH from the multiple carriers according to at least one of: a resource pool in which the sidelink data is located, measurement information of resource pools or first indication information, wherein the first indication information indicates at least one resource pool for transmitting the PSFCH.

3. The method of claim 2, wherein determining, by the first terminal according to the resource pool in which the sidelink data is located, the resource pool for transmitting the PSFCH from the multiple carriers comprises:

obtaining, by the first terminal, at least one resource pool in which a physical sidelink control channel (PSCCH) or physical sidelink shared channel (PSSCH) received on the multiple carriers from the second terminal is located; and determining, by the first terminal, the resource pool for transmitting the PSFCH from the at least one resource pool.

4. The method of claim 3, wherein determining, by the first terminal, the resource pool for transmitting the PSFCH from the at least one resource pool comprises:

determining, by the first terminal according to priority information, the resource pool for transmitting the PSFCH from the at least one resource pool; or, determining, by the first terminal according to a chronological order of the received PSCCH or PSSCH, the resource pool for transmitting the PSFCH from the at least one resource pool.

5. The method of claim 2, wherein the measurement information of the resource pools comprises channel busy ratios (CBRs) of the resource pools, and wherein determining, by the first terminal according to the measurement information of the resource pools, the resource pool for transmitting the PSFCH from the multiple carriers comprises:

selecting, by the first terminal according to the CBRs of the resource pools, the resource pool for transmitting the PSFCH from a resource pool set of the multiple carriers in an order of CBRs from low to high.

6. The method of claim 2, wherein the measurement information of the resource pools comprises channel busy ratios (CBRs) of the resource pools; and wherein determining, by the first terminal according to the measurement information of the resource pools, the resource pool for transmitting the PSFCH from the multiple carriers comprises:

determining, by the first terminal according to the CBRs of the resource pools, at least one resource pool with a CBR less than a CBR threshold from a resource pool set of the multiple carriers; and selecting, by the first terminal, a resource pool for transmitting the PSFCH from the at least one resource pool.

7. The method of claim 2, wherein the first indication information comprises index information, and wherein determining, by the first terminal according to the first indication information, the resource pool for transmitting the PSFCH from the multiple carriers comprises:

selecting, by the first terminal, a resource pool corresponding to the index information as the resource pool for transmitting the PSFCH.

8. The method of claim 1, wherein the sidelink feedback information corresponding to the sidelink data received by the first terminal from the second terminal on the multiple carriers is carried on one PSFCH, or carried on different PSFCHs.

9. The method of claim 1, wherein a resource pool in which first sidelink data received by the first terminal from the second terminal on the multiple carriers is located and a resource pool in which a PSFCH corresponding to the first sidelink data is transmitted are different resource pools, and/or a carrier on which the first sidelink data is located and a carrier on which the PSFCH corresponding to the first sidelink data is transmitted are different carriers, wherein, the first sidelink data is sidelink data received by the first terminal from the second terminal on one of the multiple carriers.

10. The method of claim 4, wherein the determining, by the first terminal according to priority information, the resource pool for transmitting the PSFCH from the at least one resource pool comprises:

determining, by the first terminal according to priority information of the sidelink data, the resource pool for transmitting the PSFCH from the at least one resource pool; or, wherein the determining, by the first terminal according to a chronological order of the received PSCCH or PSSCH, the resource pool for transmitting the PSFCH from the at least one resource pool comprises:

determining, by the first terminal, a resource pool in which the first received sidelink data is located as the resource pool for transmitting the PSFCH, or determining, by the first terminal, a resource pool in which the last received sidelink data is located as the resource pool for transmitting the PSFCH.

11. The method of claim 7, wherein the first indication information is contained in the sidelink data.

12. A resource selection apparatus, comprising:

a processor; and a memory for storing a computer program, wherein the processor is configured to execute the computer program to perform the following operations:

receiving sidelink data from a second terminal on multiple carriers; and determining a resource pool for transmitting a physical sidelink feedback channel (PSFCH) from the multiple carriers, wherein the processor is configured to execute the computer program to perform the following operations:

determining the resource pool for transmitting the PSFCH from the multiple carriers according to PSFCH configuration information, wherein the PSFCH configuration information comprises information for configuring a PSFCH format, and the PSFCH format comprises at least one of multiple PSFCH formats, and any two PSFCH formats of the multiple PSFCH formats are different in at least one of: a number of time domain symbols occupied by the PSFCH; or a maximum number of bits carried by the PSFCH.

13. The apparatus of claim 12, wherein the processor is further configured to: determine the resource pool for transmitting the PSFCH from the multiple carriers according to at least one of: a resource pool in which the sidelink data is located, measurement information of resource pools or first indication information;

wherein the first indication information indicates at least one resource pool for transmitting the PSFCH.

14. The apparatus of claim 13, wherein the processor is further configured to: obtain at least one resource pool in which a physical sidelink control channel (PSCCH) or physical sidelink shared channel (PSSCH) received on the multiple carriers from the second terminal is located, and determine the resource pool for transmitting the PSFCH from the at least one resource pool.

15. The apparatus of claim 14, wherein the processor is further configured to:

determine, according to priority information, the resource pool for transmitting the PSFCH from the at least one resource pool; or, determine, according to a chronological order of the received PSCCH or PSSCH, the resource pool for transmitting the PSFCH from the at least one resource pool.

16. The apparatus of claim 13, wherein the measurement information of the resource pools comprises channel busy ratios (CBRs) of the resource pools; and the processor is further configured to:

select, according to the CBRs of the resource pools, a resource pool for transmitting the PSFCH from a resource pool set of the multiple carriers in an order of CBRs from low to high.

17. The apparatus of claim 16, wherein the measurement information of the resource pools comprises channel busy ratios (CBRs) of the resource pools, and the processor is further configured to:

determine, according to the CBRs of the resource pools, at least one resource pool with a CBR less than a CBR threshold from a resource pool set of the multiple carriers, and select a resource pool for transmitting the PSFCH from the at least one resource pool.

18. The apparatus of claim 13, wherein the first indication information comprises index information, and the processor is further configured to:

select a resource pool corresponding to the index information as the resource pool for transmitting the PSFCH.

19. The apparatus of claim 12, wherein the sidelink feedback information corresponding to the sidelink data received from the second terminal on the multiple carriers is carried on one PSFCH, or carried on different PSFCHs.

20. The apparatus of claim 12, wherein a resource pool in which first sidelink data received from the second terminal on the multiple carriers is located and a resource pool in which a PSFCH corresponding to the first sidelink data is transmitted are different resource pools, and/or a carrier on which the first sidelink data is located and a carrier on which the PSFCH corresponding to the first sidelink data is transmitted are different carriers; and wherein, the first sidelink data is sidelink data received from the second terminal on one of the multiple carriers.

* * * * *